(12) United States Patent
Yamagajo et al.

(10) Patent No.: US 8,134,505 B2
(45) Date of Patent: Mar. 13, 2012

(54) RF TAG AND METHOD OF MANUFACTURING THE RF TAG

(75) Inventors: Takashi Yamagajo, Kawasaki (JP); Toru Maniwa, Kawasaki (JP); Manabu Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1068 days.

(21) Appl. No.: 12/007,512

(22) Filed: Jan. 11, 2008

(65) Prior Publication Data
US 2008/0111694 A1    May 15, 2008

Related U.S. Application Data

(63) Continuation of application No. PCT/JP2005/013932, filed on Jul. 29, 2005.

(51) Int. Cl.
*H01Q 1/38* (2006.01)
(52) U.S. Cl. ............... 343/700 MS; 343/795; 340/572.1
(58) Field of Classification Search ........... 343/700 MS, 343/795; 340/572.1, 572.7, 572.8
See application file for complete search history.

(56) References Cited

U.S. PATENT DOCUMENTS

| | | | |
|---|---|---|---|
| 6,806,812 B1 | 10/2004 | Cathey | |
| 7,548,167 B2 * | 6/2009 | Yamagajo et al. | 340/572.8 |
| 7,586,446 B2 * | 9/2009 | Sakama et al. | 343/702 |
| 7,619,530 B2 * | 11/2009 | Kawamata | 340/572.7 |
| 7,750,862 B2 * | 7/2010 | Hilgers | 343/726 |
| 7,773,045 B2 * | 8/2010 | Andrenko et al. | 343/803 |
| 2002/0003496 A1 | 1/2002 | Brady | |
| 2002/0190903 A1 | 12/2002 | Watada et al. | |
| 2005/0024287 A1 | 2/2005 | Jo et al. | |
| 2011/0024512 A1 * | 2/2011 | Satake et al. | 235/492 |

FOREIGN PATENT DOCUMENTS

| | | |
|---|---|---|
| CN | 1496019 A | 5/2004 |
| EP | 1 538559 | 6/2005 |
| JP | 2004-104344 | 4/2004 |
| JP | 2005-080200 | 3/2005 |

OTHER PUBLICATIONS

AWID Prox-Line; Passive Tags for Long-Range Reader; Jun. 9, 2004.
Taiwan Office Action issued in corresponding Taiwan Application No. 094125792 dated May 16, 1997with English Translation.
Communication dated Aug. 21, 2008; Extended European Search Report in the corresponding European Patent Application No. 05767180.2-1248.

* cited by examiner

*Primary Examiner* — Tan Ho
(74) *Attorney, Agent, or Firm* — Murphy & King, P.C.

(57) ABSTRACT

An RF tag is disclosed that includes an antenna and an integrated circuit connected to the antenna. The antenna includes a first radiating element, a second radiating element, a feeding part connected in series between the first and second radiating elements, and an impedance control part connected parallel to the feeding part. An auxiliary radiating element connected to one or both of the first and second radiating elements is used for radio communication with the integrated circuit before completion of the RF tag, and is not used for radio communication after the completion of the RF tag.

13 Claims, 25 Drawing Sheets

UNIT : mm

UNIT : mm

FIG.11A

| SPACER THICKNESS [mm] | PATTERN [mm²] | s2 [mm] | GAIN [dBi] | COVERAGE DISTANCE RATIO TO REFERENCE ANTENNA [%] | COVERAGE DISTANCE (1ST EXAMPLE) [cm] | COVERAGE DISTANCE (2ND EXAMPLE) [cm] |
|---|---|---|---|---|---|---|
| 1 | 63×7 | 14.05 | -9.69 | 26.04 | 59.89 | 78.11 |
| 2 | 63×7 | 17.95 | -5.58 | 41.77 | 96.06 | 125.30 |
| 3 | 73×7 | 14.68 | -1.03 | 70.58 | 162.34 | 211.75 |
| 4 | 73×7 | 16.89 | 0.45 | 83.63 | 192.35 | 250.89 |
| 5 | 73×7 | 18.61 | 1.54 | 94.89 | 218.25 | 284.67 |

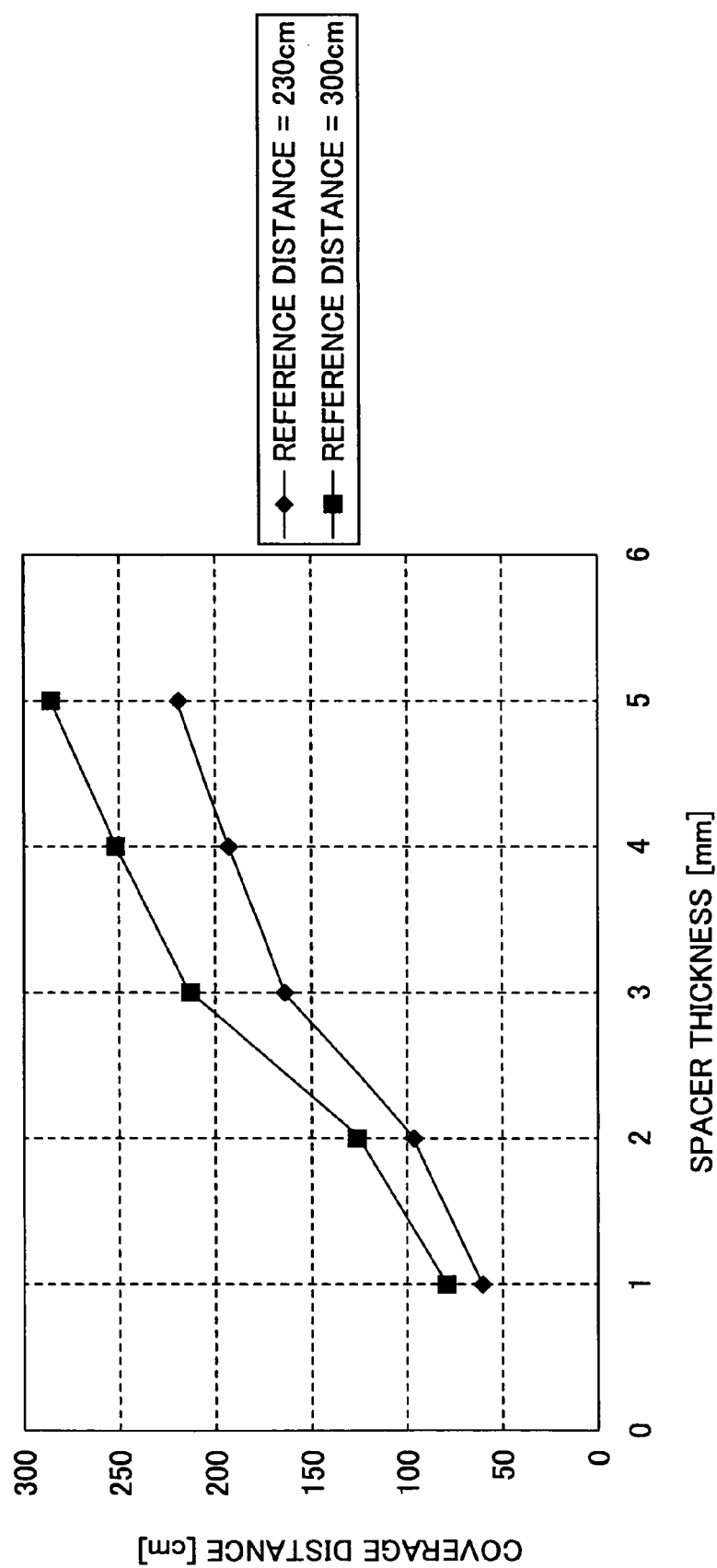

FIG.15A

| SPACER THICKNESS [mm] | PATTERN [mm²] | s2 [mm] | GAIN [dBi] | COVERAGE DISTANCE RATIO TO REFERENCE ANTENNA [%] | COVERAGE DISTANCE (1ST EXAMPLE) [cm] | COVERAGE DISTANCE (2ND EXAMPLE) [cm] |
|---|---|---|---|---|---|---|
| 1 | 63×7 | 6.03 | -13.25 | 17.29 | 39.76 | 51.86 |
| 2 | 63×7 | 11.36 | -9.48 | 26.68 | 61.37 | 80.04 |
| 3 | 63×7 | 14.69 | -7.05 | 35.28 | 81.15 | 105.84 |
| 4 | 73×7 | 9.71 | -3.53 | 52.93 | 121.74 | 158.79 |
| 5 | 73×7 | 12.29 | -2.20 | 61.66 | 141.82 | 184.98 |

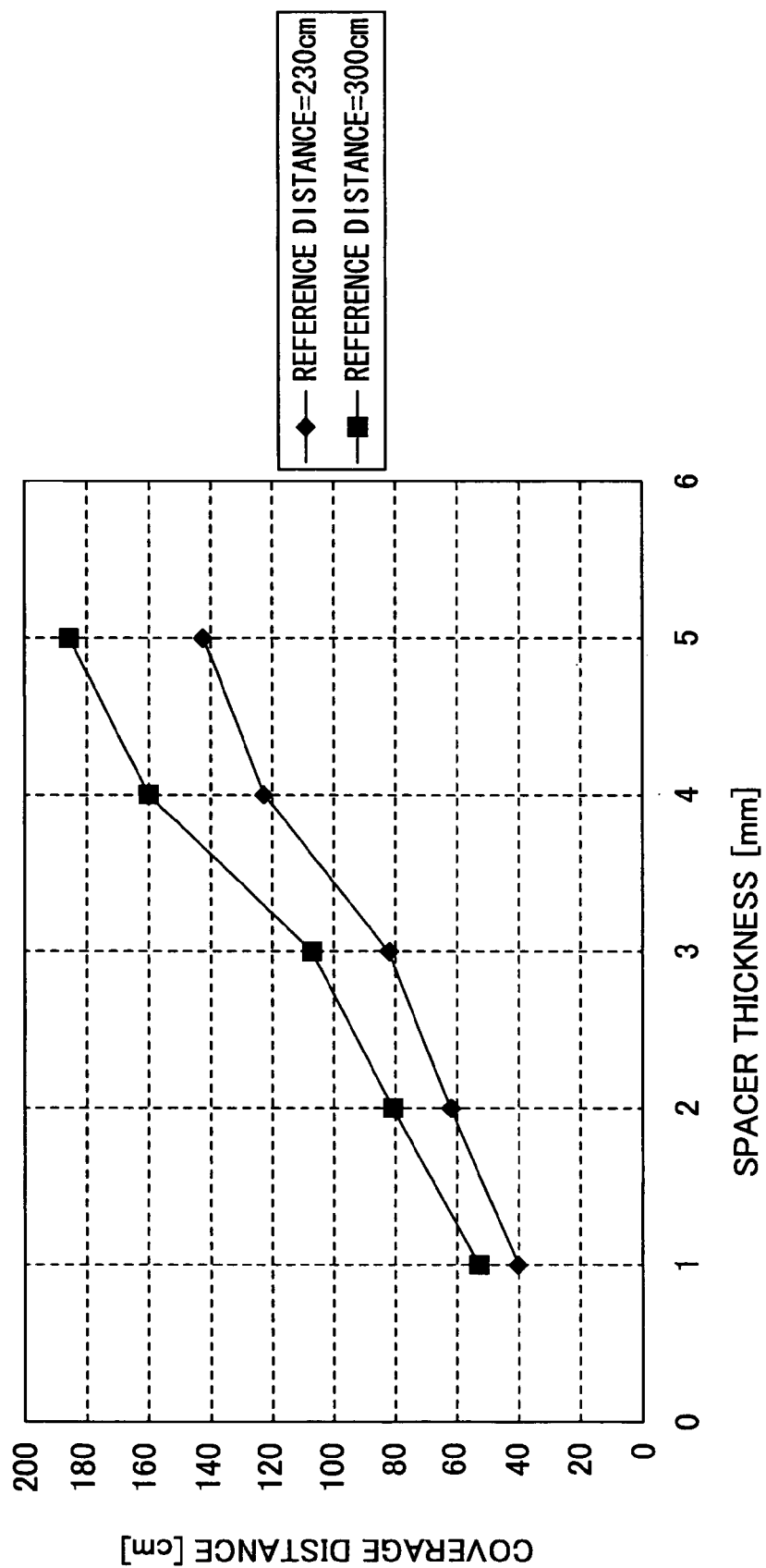

RF TAG AND METHOD OF MANUFACTURING THE RF TAG

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2005/013932, filed on Jul. 29, 2005, the entire contents of which are hereby incorporated by reference.

BACKGROUND OF THE INVENTION

1. Field of the Invention

The present invention relates to an RF tag and a method of manufacturing the RF tag.

2. Description of the Related Art

RF tags are sometimes used to manage various objects such as commodities and articles. Such a system includes multiple RF tags and a reader/writer that reads information from or writes information onto the RF tags (hereinafter referred to as "RF tag reader"). Each object is accompanied by an RF tag. The reader is also referred to as "interrogator." The RF tag may also be referred to as "RFID tag," "radio tag," or "IC tag." For example, data such as identification information (ID), a serial number, a manufacturing date, and a manufacturing location may be written onto the RF tag.

In general, there are active RF tags and passive RF tags. Active RF tags can provide power by themselves and thus can simplify the device configuration on the RF tag reader side. The latter cannot provide power by themselves, and receive external energy to perform operations such as transmission of ID information. The passive type is preferable in terms of lowering the price of RF tags, and is particularly promising.

In terms of a signal frequency band to use, there are an electromagnetic coupling system and an electromagnetic wave system. The former uses a frequency band around several kHz, a frequency band around 13 MHz, and the like. The latter uses higher frequency bands such as the UHF band (for example, 950 MHz) and 2.45 GHz. It is preferable to use a high frequency signal in terms of enabling communications over a longer distance or reducing the dimensions of RF tags. For example, the electromagnetic coupling system is known to allow communications over no more than approximately 1 m. Further, one wavelength can be approximately 30 cm at 950 MHz but is as long as 23 m at 13 MHz.

The RF tag may accompany various objects. It is considered particularly important in designing the RF tag whether the object is conductive. If the object has an insulation quality, the operating characteristics of the RF tag do not change very greatly between before and after attachment of the RF tag. However, if the RF tag is attached to a conductor such as a metal enclosure, an image current due to the conductor is generated when the RF tag performs communications. Accordingly, the operating characteristics of the RF tag change greatly between before and after its attachment to the conductive object.

Non-Patent Document 1 at the time of the filing of the present application carries a conventional RF tag attachable to metal.

[Non-Patent Document 1]
http://www.awid.com/webresources/documents/products/MT%20Tag_LR-911%206-04.pdf The conventional RF tag as described in Non-Patent Document 1 has an antenna structure so as to operate as a dipole antenna longer than a half-wavelength. More specifically, a conductive material representing an antenna pattern is provided on one side of a dielectric, and a metal layer is formed on the other side of the dielectric, so that the overall length is designed to be approximately a half-wavelength. Since the operating frequency is 902-928 MHz, the overall length is approximately 17 cm. However, there is a problem in that objects to which the RF tag is attached are greatly limited in type by this size.

Further, the antenna size and the material characteristics of the insulating layer of the conventional RF tag are determined so that it is possible to perform desired radio communications when the RF tag is attached to a conductive object. Accordingly, during the manufacturing process of the RF tag, it is difficult to use information in an integrated circuit in the RF tag through the antenna at a stage where only the conductive layer part of the antenna is prepared (an underlying dielectric layer and a ground conductive layer are not formed). Therefore, in the case of an RF tag to accompany a conductive object, unlike in the case of an RF tag to accompany a nonconductive object, there is a problem in that it is not possible to make effective use of information in the RF tag before its completion.

SUMMARY OF THE INVENTION

Embodiments of the present invention may solve or reduce one or more of the above-described problems.

According to one embodiment of the present invention, there are provided an RF tag in which one or more of the above-described problems may be solved or reduced, and a method of manufacturing the RF tag.

According to one embodiment of the present invention, there are provided an RF tag that enables communications therewith even before its completion, and a method of manufacturing the RF tag.

According to one embodiment of the present invention, there is provided an RF tag including an antenna and an integrated circuit connected to the antenna, wherein the antenna includes a first radiating element, a second radiating element, a feeding part connected in series between the first and second radiating elements, and an impedance control part connected parallel to the feeding part, and wherein an auxiliary radiating element connected to one or both of the first and second radiating elements is used for a radio communication with the integrated circuit before completion of the RF tag, and is not used for a radio communication after the completion of the RF tag.

According to one embodiment of the present invention, there is provided a method of manufacturing an RF tag to accompany a conductive object, the RF tag having an integrated circuit connected to an antenna, the method including a first step of forming the antenna of a predetermined shape on one surface of a first insulating layer; a second step of changing the antenna of the predetermined shape into another shape; and a third step of joining a second insulating layer to another surface of the first insulating layer, wherein the antenna of the predetermined shape is formed so as to have a first radiating element, a second radiating element, an auxiliary radiating element connected to one or both of the first and second radiating elements, and a feeding part connected in series between the first and second radiating elements.

According to the present invention, it is possible to communicate with an RF tag to accompany a conductive object even before completion of the RF tag.

BRIEF DESCRIPTION OF THE DRAWINGS

Other objects, features and advantages of the present invention will become more apparent from the following detailed description when read in conjunction with the accompanying drawings, in which:

FIG. 11A is a table showing the relationship among various parameters and the coverage distance of an antenna ($\epsilon_r=2.3$);

FIG. 11B is a diagram showing the relationship between spacer thickness and coverage distance ($\epsilon_r=2.3$);

FIG. 15A is a table showing the relationship among various parameters and the coverage distance of an antenna ($\epsilon_r=2.3$);

FIG. 15B is a diagram showing the relationship between spacer thickness and coverage distance ($\epsilon_r=2.3$);

DETAILED DESCRIPTION OF THE PREFERRED EMBODIMENTS

Figure 1A:
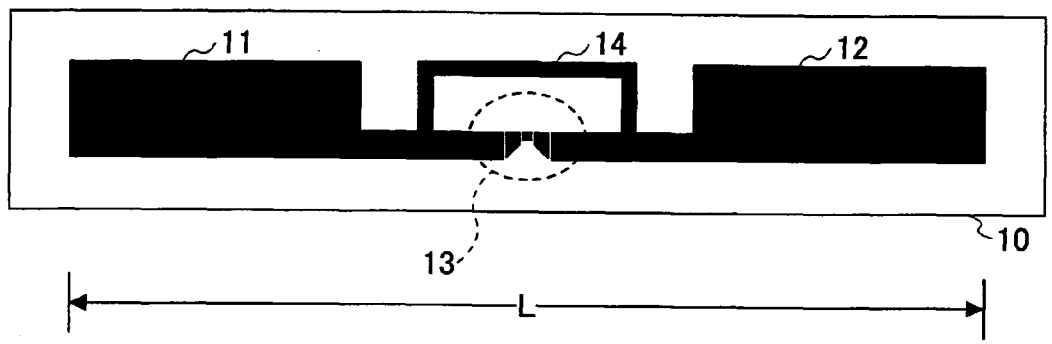
FIG. 1A shows a plan view of an RF tag according to one embodiment of the present invention.

A description is given below, with reference to the accompanying drawings, of embodiments of the present invention.

According to one embodiment of the present invention, a method of manufacturing an RF tag that has an integrated circuit connected to an antenna and accompanies a conductive object is used. This method has a first step of forming an antenna of a predetermined shape on one surface of a first insulating layer; a second step of changing the antenna of the predetermined shape into another shape; and a third step of joining a second insulating layer to the other surface of the first insulating layer. The antenna of the predetermined shape is formed so as to have a first radiating element, a second radiating element, an auxiliary radiating element connected to one or both of the first and second radiating elements, and a feeding part connected in series between the first and second radiating elements. Providing such an auxiliary radiating element makes it possible to perform radio communications with the RF tag even in the middle of its manufacturing process, use information in the integrated circuit (memory), and perform product management and physical distribution management even before completion of the RF tag. The auxiliary radiating element is necessary for the radio communications of the RF tag before its completion, but is unnecessary for the radio communications of the RF tag after its completion. Radio communication using the first, second, and auxiliary radiating elements is performed after the first step, and at least part of the auxiliary radiating element is removed in the second step.

The auxiliary radiating element may be formed so as to include a line along a lengthwise direction of the antenna. Further, the auxiliary radiating element may be formed into a meandering shape. As a result, it is possible to effectively increase the antenna length even with a small area.

The information determined by the radio communication may be attached on the first or second insulating layer. For example, a mark indicating one or more positions may be attached on the first or second insulating layer. Further, at least part of the auxiliary radiating element may be removed in accordance with a mark corresponding to the thickness of the second insulating layer. It is possible to establish impedance matching between the antenna and the integrated circuit by controlling the length or area of the antenna aside from controlling the inductor length. It is possible to further facilitate manufacturing the antenna by indicating a cutting position of the antenna with a mark.

According to one embodiment of the present invention, a feeding part is connected in series between first and second radiating elements so as to form a minute dipole antenna, and an impedance control part is connected parallel to the feeding part. By providing an inductor in parallel with the feeding part of the minute dipole antenna, it is possible to form a minute dipole antenna that operates in the UHF band. As a result, it is possible to realize an RF tag having an antenna shorter than half of the operating wavelength.

The first and second radiating elements may have a symmetric shape with respect to the feeding part. Each of the first and second radiating elements may be formed of a conductor extending in a strip shape. Further, the feeding part may be connected to a line extending along a side of each of the conductors having the strip shape. Further, two sides of one of the conductors having the strip shape along a direction in which the one of the conductors extends may be aligned with two sides of another one of the conductors. Such alignment is preferable in terms of making the antenna compact and smaller in size.

The inductor may be formed of a bent conductive line or may be formed of a lumped element. Forming the inductor of a conductive line is preferable in terms of simplification of the manufacturing process because patterning can be performed the same as (in some cases, simultaneously with) the antenna pattern. Further, it is possible to appropriately control inductance by controlling the line length. The impedance of the RF tag may be controlled by removing part of one or both of the first and second radiating elements aside from controlling the inductance of the inductor provided parallel to the feeding part.

An insulating layer supporting the antenna may have a multilayer structure including at least a polyethylene terephthalate (PET) layer and a spacer layer. For example, it is possible to manufacture the RF tag with ease by sticking a PET film onto a spacer layer.

A conductive layer may be provided on the bottom surface of the insulating layer supporting the antenna layer. This is preferable in that it is possible to ensure having a ground conductor on the bottom side of the RF tag irrespective of its mode of use. The conductive layer provided on the bottom surface may be provided evenly on the surface or may be provided so as to have a mesh pattern. The latter is preferable in terms of saving on the use of a metal material.

[First Embodiment]

Figure 1B:
FIG. 1B shows a side view of the RF tag according to the embodiment of the present invention.
Figure 1C:
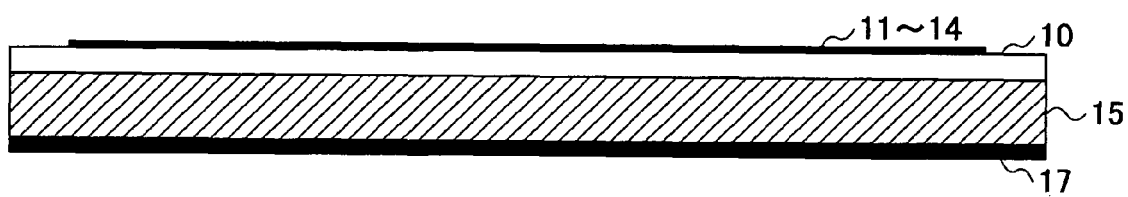
FIG. 1C shows a side view of the RF tag according to the embodiment of the present invention.

FIGS. 1A through 1C show an RF tag according to one embodiment of the present invention. FIG. 1A shows a plan view of the RF tag. FIG. 1B shows a side view of the RF tag. As graphically illustrated, the RF tag includes an insulating spacer 15, an insulating film 10 attached to the spacer 15, and an antenna pattern formed on the insulating film 10.

The spacer 15 has a thickness of, for example, several mm, and has a predetermined relative dielectric constant such as 2.3. The RF tag is attached to a conductive object (not graphically illustrated), and the object is attached to the bottom surface (a surface on the side on which the insulating film 10 is not attached) of the spacer 15. Examples of the conductive object may include any appropriate conductive articles such as the enclosure of a personal computer, steel office supplies, and steel frame materials at construction sites. The surface of the conductive object may not have sufficiently high electrical conductivity. For example, the coating material or the surface unevenness of the conductive object may prevent the surface of the conductive object from sufficiently exhibiting its characteristic as a conductor. In this case, a conductive layer 17 may be formed on the bottom surface of the spacer 15 as shown in FIG. 1C.

The insulating film 10 may be formed of any layer on which an appropriate antenna pattern is formable. In this embodiment, the insulating film 10 is formed of a polyethylene terephthalate (PET) material.

As shown in FIG. 1A, the antenna pattern has symmetry in the lateral length directions in the drawing. An antenna formed with this pattern forms a planar antenna, and includes a first radiating element 11, a second radiating element 12, a feeding part 13 connected in series therebetween, and an inductor connected parallel to the feeding part 13.

The first and second radiating elements 11 and 12 have a wide strip shape along the lengthwise directions. The feeding part 13 is connected in series between the radiating elements 11 and 12 with narrow lines. In practice, an integrated circuit is contained in a broken line indicating the feeding part 13. This integrated circuit secures power using a signal received from a reader (interrogator) through the antenna, creates an appropriate response signal in accordance with the contents of the instruction of the received signal (control signal), and transmits it. The first and second radiating elements 11 and 12 and the feeding part 13 play central roles for the antenna to operate as a dipole antenna. The inductor 14, which is provided in parallel with the feeding part 13, is formed of a narrow line to have a rectangular shape. The planar shape of the inductor 14 is not limited to a rectangular shape, but is required to at least be formed like a closed curve and function as an induction element at the time of operations. The inductor 14 is principally used to match the impedance of the antenna with the integrated circuit of the feeding part 13. Accordingly, the inductor 14 may also be formed of a three-dimensional lumped element in place of a planar line on the insulating film. However, in terms of simplification of a manufacturing process, it is advantageous to form the inductor simultaneously at the time of forming the antenna pattern by forming the inductor 14 with a line as graphically illustrated. Employment of such an antenna pattern makes it possible to make the overall length L of the antenna shorter than the operating wavelength. In this embodiment, in the case of an operating frequency of 950 MHz (corresponding to a wavelength of 316 mm), the overall length L can be made approximately 60 mm, extremely shorter than the half-wavelength (158 mm).

Figure 2:
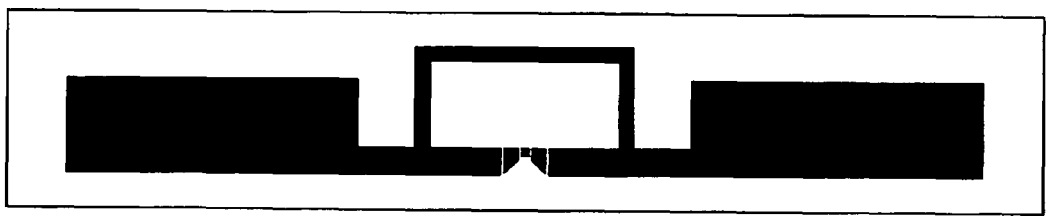
FIG. 2 is a diagram showing an antenna pattern.
Figure 3:
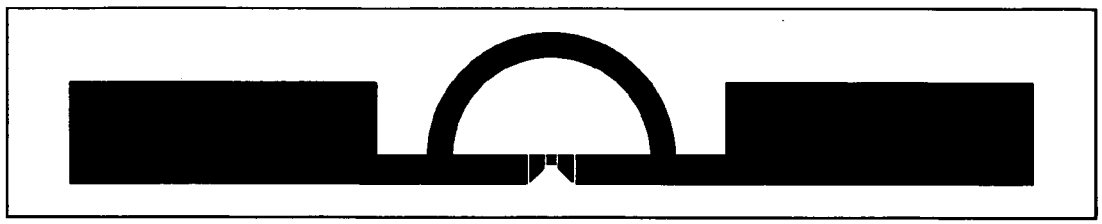
FIG. 3 is a diagram showing an antenna pattern.
Figure 4:
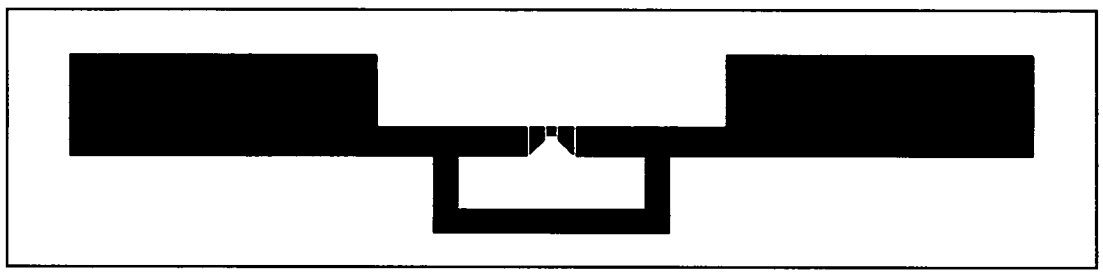
FIG. 4 is a diagram showing an antenna pattern.
Figure 5:
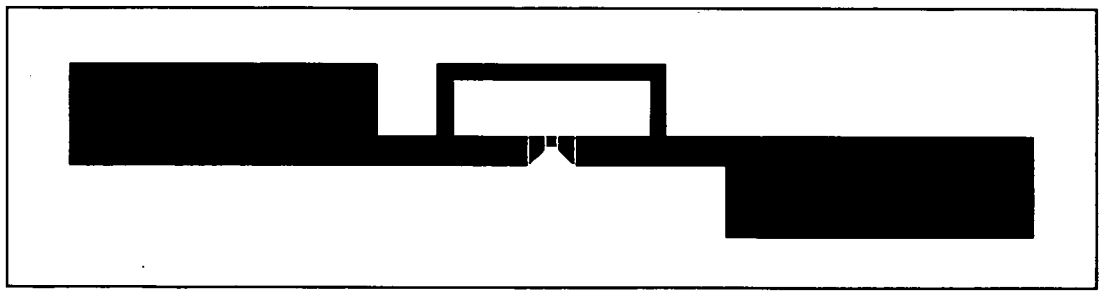
FIG. 5 is a diagram showing an antenna pattern.
Figure 6:
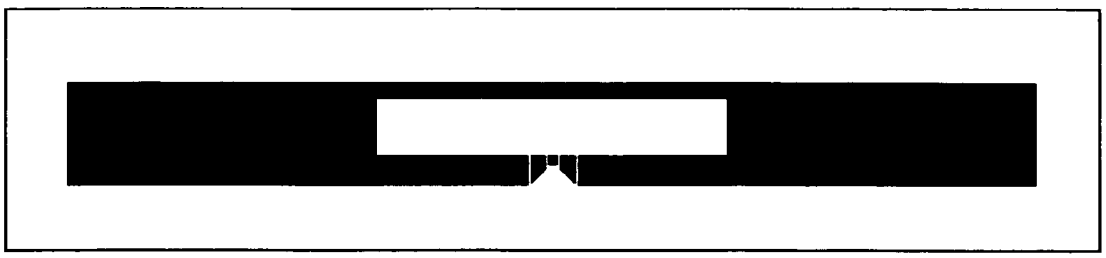
FIG. 6 is a diagram showing an antenna pattern.
Figure 7:
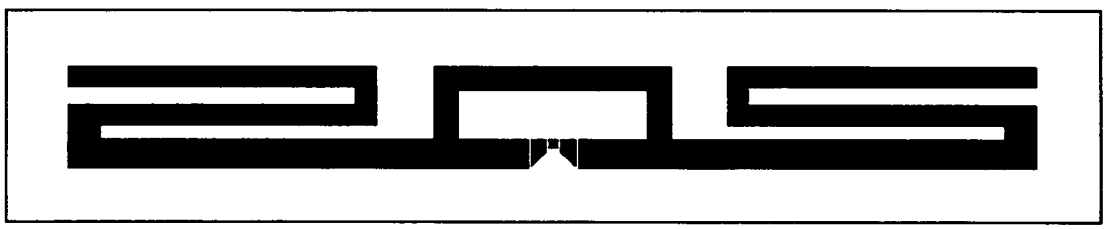
FIG. 7 is a diagram showing an antenna pattern.

The antenna pattern is not limited to the one shown in FIG. 1A, and various patterns as shown in FIG. 2 through FIG. 7 may also be used. The inductor 14 may be formed to further increase inductance as required as shown in FIG. 2. The inductor 14 may not be rectangular, and may be formed into an arc shape as shown in FIG. 3. The inductor 14 may be arranged on the same straight line as the two strip conductive plates (11, 12) as shown in FIGS. 1A and 2, or may not be arranged on the same straight line as shown in FIG. 4. The first and second radiating elements 11 and 12 may be shaped in point symmetry as shown in FIG. 5, instead of bilateral symmetry, with respect to the feeding part 13. The narrow lines connecting the first and second radiating elements 11 and 12 (FIG. 1A) are not necessary, and may be omitted as shown in FIG. 6. It is not necessary for the first and second radiating elements 11 and 12 to be conductive plates, and the first and second radiating elements 11 and 12 may be formed like meanders with zigzag meandering lines. Alternatively, although not graphically illustrated, the radiating elements may be formed like a mesh.

EXAMPLE SIMULATION 1

Figure 8A:
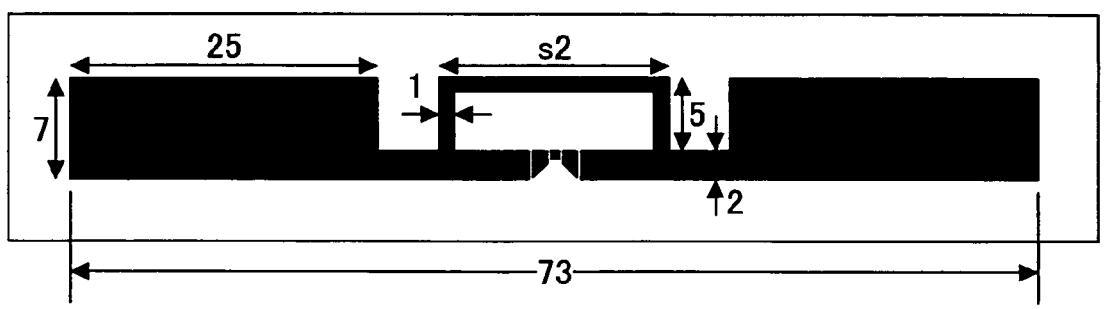
FIG. 8A is a diagram showing an antenna shape assumed in a simulation.

FIGS. 8A through 8D show an example simulation of the antenna characteristics of an RF tag according to the present invention. FIG. 8A shows assumed antenna dimensions. It is assumed that an antenna having such dimensions is formed on a spacer of vertically 11 mm, horizontally 79 mm (in the lateral directions in the drawing), and (t) mm thick. The effect by the PET film 10 is omitted for simplification. It is assumed that the overall length of the antenna is 73 mm and the thickness of the antenna pattern is 35 μm. Further, it is assumed that the spacer has a relative dielectric constant of 2.3 and a dielectric loss (tanδ) of $2\times10^{-4}$. As shown in FIG. 8A, an inductor is formed to have rectangular dimensions of vertically 5 mm and horizontally (s2) mm with a line width of 1 mm. For convenience, s2 is referred to as inductor length.

Figure 8B:
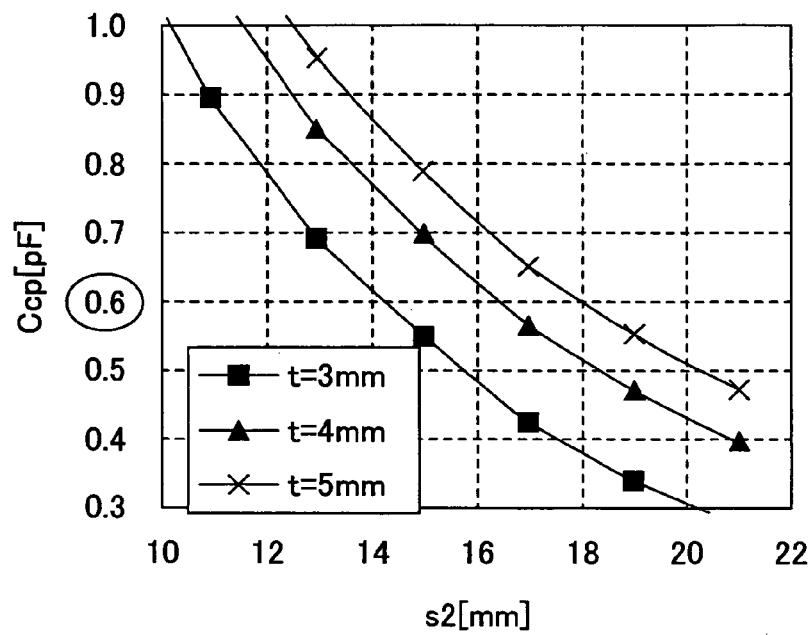
FIG. 8B is a diagram showing the correspondence between inductor length and capacitance ($\epsilon_r=2.3$)
Figure 9:
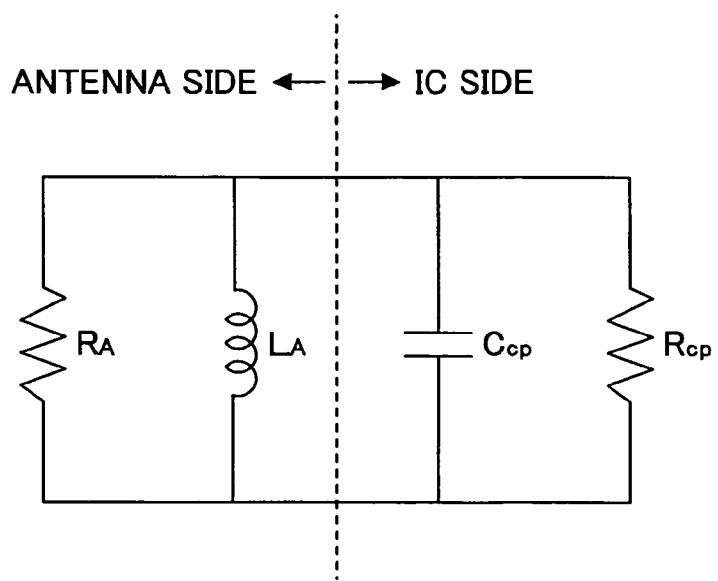
FIG. 9 shows an equivalent circuit regarding an antenna and an integrated circuit.

The three graphs shown in FIG. 8B show the relationship between chip capacitance $C_{CP}$ and the inductor length s2 with respect to spacer thicknesses t of 3, 4, and 5 mm. Here, the chip capacitance $C_{CP}$ is the capacitance of an integrated circuit provided in the feeding part. In general, an equivalent circuit with respect to the antenna and the integrated circuit of the feeding part can be expressed as in FIG. 9. If the antenna and the integrated circuit are matched, their resistance components are equal to each other, and a predetermined relationship holds between the inductance $L_A$ on the antenna side and the capacitance $C_{CP}$ on the integrated circuit side. That is, $$R_A = R_{CP}; \text{ and}$$

$$\omega L_A = (\omega C_{CP})^{-1},$$

where ω is an angular frequency. In this embodiment, the antenna-side inductance $L_A$ is controlled by controlling the inductor length s2, thereby satisfying the above-described relationship. By way of example, it is assumed that the capacitance $C_{CP}$, which depends on a use, is approximately 0.6 pF. (Typically, the capacitance is approximately in the range of 0.5 pF through 0.7 pF, and $C_{CP}$ is equal to 0.57 pF in the simulation.) FIGS. 8A and 8B show that the inductor length s2 should be approximately 18 (18.61) mm when the spacer thickness t is 5 mm.

Figure 8C:
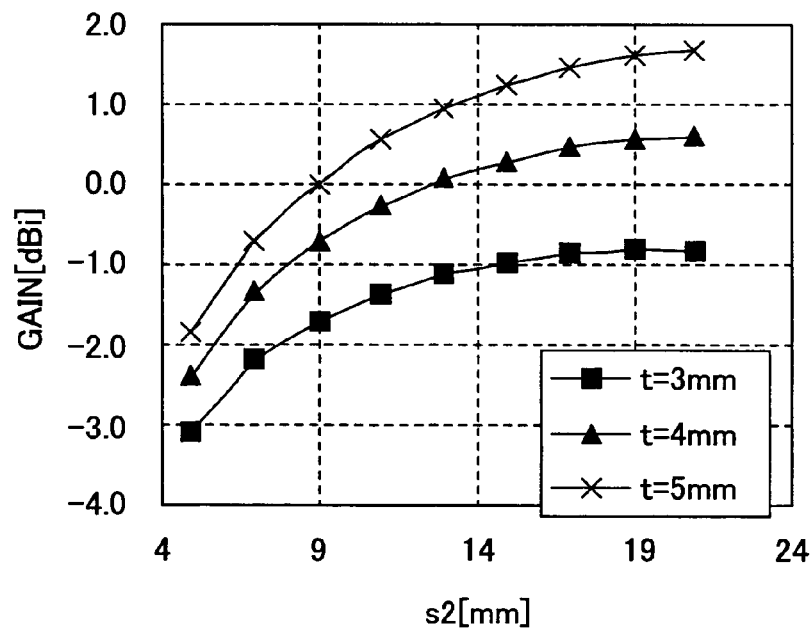
FIG. 8C is a diagram showing the correspondence between inductor length and gain ($\epsilon_r=2.3$)

The three graphs shown in FIG. 8C show the relationship between antenna gain (dBi) and the inductor length s2 with respect to spacer thicknesses t of 3, 4, and 5 mm. FIG. 8C shows that the gain is 1.54 dBi for t=5 and s2=18.61 mm derived in FIG. 8B.

Figure 8D:
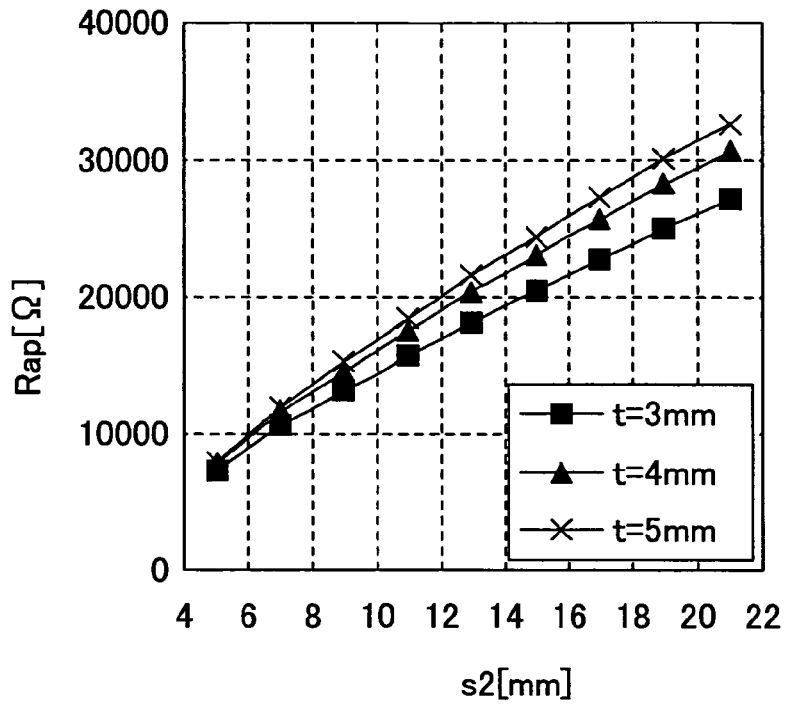
FIG. 8D is a diagram showing the correspondence between inductor length and resistance ($\epsilon_r=2.3$)

The three graphs shown in FIG. 8D show the relationship between antenna resistance (Ω) and the inductor length s2 with respect to spacer thicknesses t of 3, 4, and 5 mm. FIG. 8C shows that the resistance is approximately 28 kΩ for t=5 and s2=18.61 mm derived in FIG. 8B.

If the spacer thickness t is 4 mm, it is necessary from FIG. 8B that the inductor length s2 be approximately 17 (16.89) mm. In this case, it is known from FIG. 8C that the antenna gain is approximately 0.45 dBi and from FIG. 8D that the resistance is approximately 25 kΩ. Further, if the spacer thickness t is 3 mm, it is necessary from FIG. 8B that the inductor length s2 be approximately 14.5 (14.68) mm. In this case, it is known from FIG. 8C that the antenna gain is approximately −1 dBi and from FIG. 8D that the resistance is approximately 20 kΩ.

Of the elements determining the impedance to be matched ($R_A$, $L_A$, and gain), the inductance $L_A$ (capacitance $C_{CP}$) is determined first. This is because it is most important for impedance matching. The antenna gain is also important. However, even if it is high, it is difficult to benefit from high gain if there is no matching with the integrated circuit.

By the way, the three graphs of FIG. 8B show that the graph appears more to the left as the spacer thickness t decreases. This means that as the spacer thickness t decreases, an appropriate inductor length s2 also decreases. Accordingly, further reduction in the spacer thickness t in the assumptions of this simulation requires the inductor length s2 to be shorter, which makes it difficult to process material or may make it difficult to obtain an inductor length appropriate for matching itself.

Figure 10A:
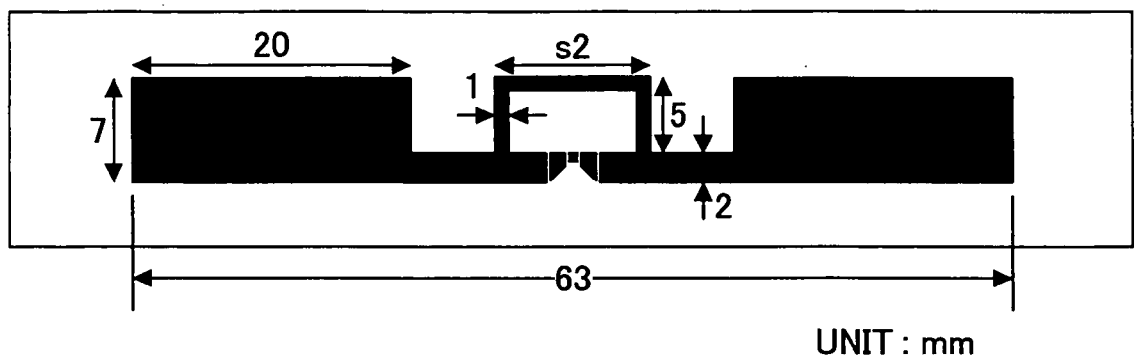
FIG. 10A is a diagram showing an antenna shape assumed in a simulation.

Therefore, the inventors of the present invention performed simulations using a smaller antenna pattern as shown in FIG. 10A.

EXAMPLE SIMULATION 2

FIG. 10A shows assumed antenna dimensions. It is assumed that an antenna having such dimensions is formed on a spacer of vertically 11 mm, horizontally 79 mm (in the lateral directions in the drawing), and (t) mm thick. It is assumed that the thickness of the antenna pattern is 35 μm. Further, it is assumed that the spacer has a relative dielectric constant of 2.3 and a dielectric loss (tanδ) of $2\times10^{-4}$. As shown in FIG. 10A, the inductor has a line width of 1 mm and rectangular dimensions of vertically 5 mm and horizontally (s2) mm. These specifications are the same as those shown in FIG. 8A, but there is a difference in that the overall length of the antenna is reduced to 63 mm.

Figure 10B:
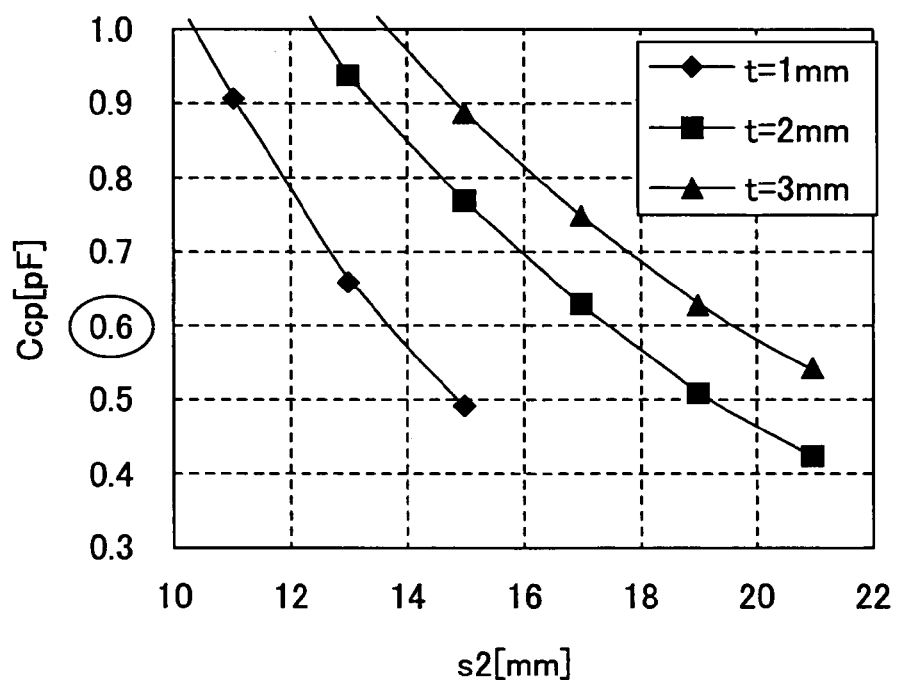
FIG. 10B is a diagram showing the correspondence between inductor length and capacitance ($\epsilon_r=2.3$)
Figure 10C:
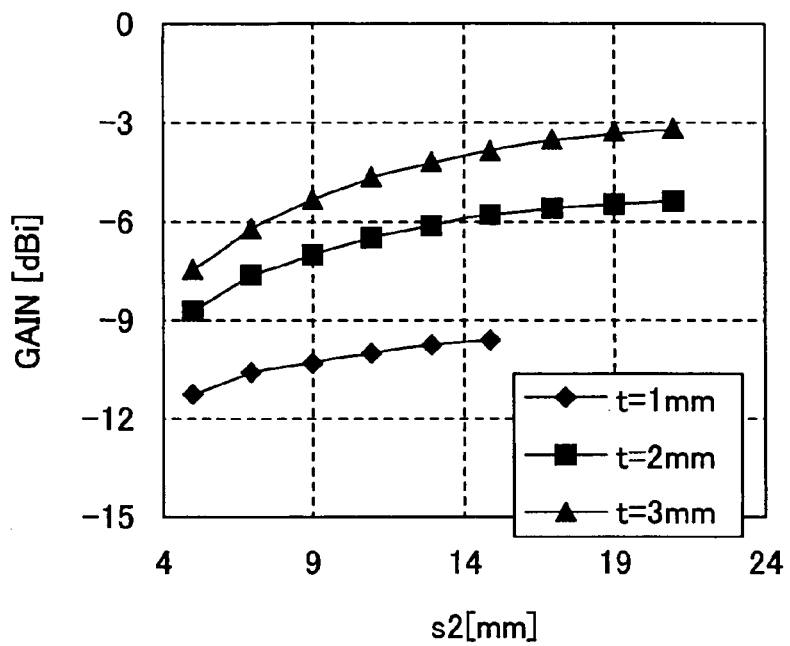
FIG. 10C is a diagram showing the correspondence between inductor length and gain ($\epsilon_r=2.3$)
Figure 10D:
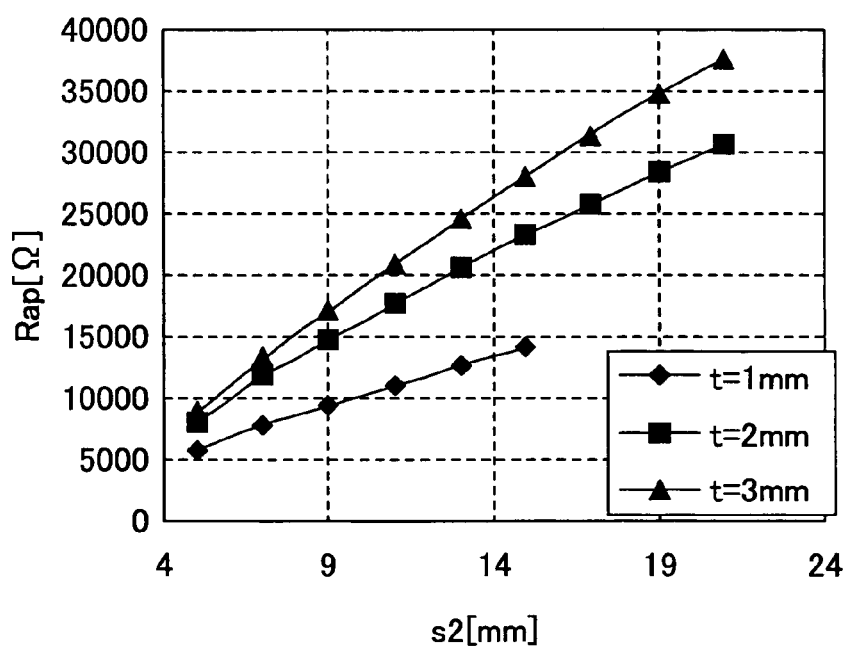
FIG. 10D is a diagram showing the correspondence between inductor length and resistance ($\epsilon_r=2.3$)

The three graphs of FIG. 10B show the relationship between the chip capacitance $C_{CP}$ and the inductor length s2 with respect to spacer thicknesses t of 1, 2, and 3 mm. The three graphs of FIG. 10C show the relationship between the antenna gain (dBi) and the inductor length s2 with respect to spacer thicknesses t of 1, 2, and 3 mm. The three graphs of FIG. 10D show the relationship between the antenna resistance (Ω) and the inductor length s2 with respect to spacer thicknesses t of 1, 2, and 3 mm.

In this embodiment, the antenna-side inductance $L_A$ is controlled by controlling the inductor length s2, thereby satisfying the above-described relationship. In the simulation, $C_{CP}$ is equal to 0.57 pF. If the spacer thickness t is 3 mm, it is necessary from FIG. 10B that the inductor length s2 be approximately 19.5 mm. In this case, it is known that the antenna gain is approximately −3.5 dBi and that the resistance is approximately 35 kΩ. If the spacer thickness t is 2 mm, it is necessary from FIG. 10B that the inductor length s2 be approximately 17.5 mm. In this case, it is known from FIG. 10C that the antenna gain is approximately −5.5 dBi and from FIG. 10D that the resistance is approximately 25 kΩ. Further, if the spacer thickness t is 1 mm, it is necessary from FIG. 10B that the inductor length s2 be approximately 13.5 mm. In this case, it is known from FIG. 10C that the antenna gain is approximately −10 dBi and from FIG. 10D that the resistance is approximately 13 kΩ.

Thus, by reducing the overall length of the antenna from 73 mm to 63 mm, it is possible to find an inductor length s2 corresponding to an appropriate capacitance $C_{CP}$ and to achieve impedance matching even if the spacer thickness t is less than 3 mm.

EXAMPLE SIMULATION 3

FIG. 11A shows the relationship among various parameters and the coverage distance of the antenna. The relationship among the spacer thickness t of the antenna, the dimensions of the antenna, the inductor length s2, and the gain is the same as that obtained from the results of the simulations shown in FIGS. 8A through 8D and FIGS. 10A through 10D.

The coverage distance ratio to a reference antenna is the ratio (%) of the communication distance over which communications are performable with an antenna shorter than a half-wavelength according to this embodiment to the communication distance over which communications are performable with a half-wavelength dipole antenna having a gain of 2 dBi (supported by a spacer having the thickness t) (reference distance). The communication distance varies with the communications environment. For example, the communication distance varies with a radio communications environment around an RF tag and also with the conductivity, type, and size of an object to which the RF tag is attached. The reference distance is set at 230 cm in the coverage distance (first example), and the reference distance is set at 300 cm in the coverage distance (second example). The latter indicates a better communications environment than the former.

In the case of a spacer thickness of 1 or 2 mm, an antenna having a short overall length as shown in FIG. 10A is used. In this case, the coverage distance ratio to a reference antenna is approximately 26% and approximately 42% as shown in the second and third rows of the ratio in the table. In the case of spacer thicknesses of 3, 4, and 5 mm, an antenna having a long overall length as shown in FIG. 8A is used. In this case, the coverage distance ratio to a reference antenna is approximately 71%, approximately 84%, and approximately 95%, respectively, as shown in the fourth through sixth rows of the ratio in the table. FIG. 11B shows a graph of the relationship between the spacer thickness and the coverage distance in the case of a reference distance of 230 cm and in the case of a reference distance of 300 cm. It is shown, as graphically illustrated, that as the spacer thickness increases, the coverage distance increases. According to this embodiment, it is possible to achieve gain and coverage distance approximately equal to those of a half-wavelength dipole antenna with an antenna much shorter (6 through 7 cm) in length than the half-wavelength (approximately 16 cm). As a result, it is possible to obtain an RF tag extremely small in size.

EXAMPLE SIMULATION 4

Figure 12:
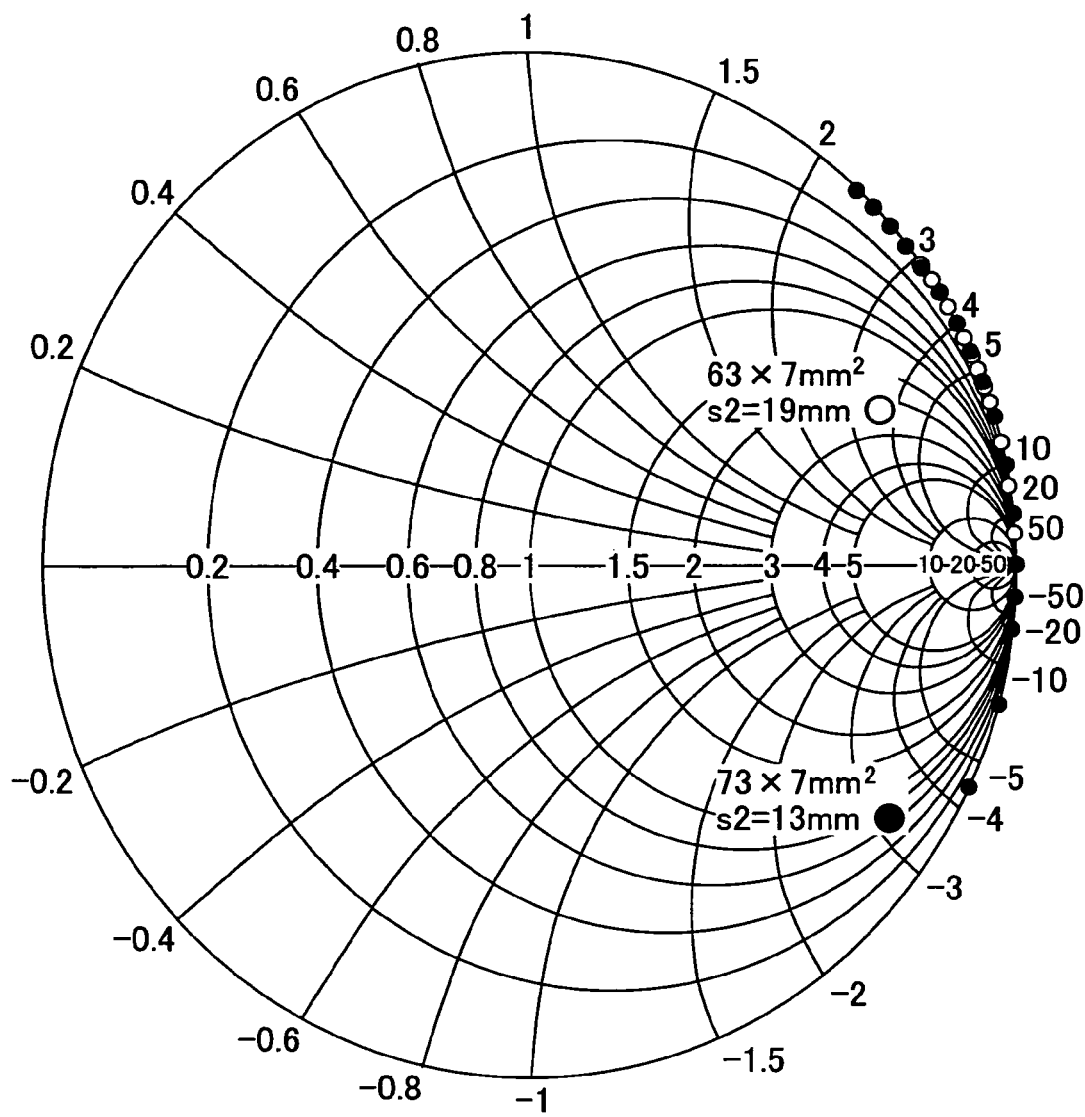
FIG. 12 is a Smith chart showing frequency characteristics of antenna patterns ($\epsilon_r=2.3$)

FIG. 12 is a Smith chart showing frequency characteristics with respect to two antenna patterns. In this simulation, an antenna having an overall length L of 73 mm as shown in FIG. 8A, an inductor length s2 of 13 mm, and a spacer thickness t of 3 mm (referred to as "long antenna" for convenience), and an antenna having an overall length L of 63 mm as shown in FIG. 10A, an inductor length s2 of 19 mm, and a spacer thickness t of 3 mm (referred to as "short antenna" for convenience) are prepared. Each spacer has a relative dielectric constant of 2.3. The impedances of the short antenna and the long antenna are measured every 20 MHz in the frequencies between 800 MHz and 1.1 GHz, and are plotted onto a Smith chart, which is shown in FIG. 12. In the drawing, the locus plotted with white circles is for the short antenna, and the locus plotted with black circles is for the long antenna. In general, as the frequency gradually increases, the antenna impedance plots a locus moving clockwise around a certain circle on the Smith chart. In each antenna, impedance variations are limited relative to frequency variations. Accordingly, both can be used for broadband product uses. The results of this simulation show that the short antenna is particularly suitable for broadband because the short antenna has smaller impedance variations.

[Second Embodiment]

The simulations set forth below are performed in the same manner as Example Simulations 1 through 4 of the first embodiment. However, different spacer characteristics are assumed in Example Simulations 5 through 8 described below in a second embodiment. The spacer has a relative dielectric constant of 2.3 and a dielectric loss (tan δ) of $2 \times 10^{-4}$ in the first embodiment, but has a relative dielectric constant of 3.0 and a dielectric loss (tan δ) of 0.01 in the second embodiment.

EXAMPLE SIMULATION 5

Figure 13A:
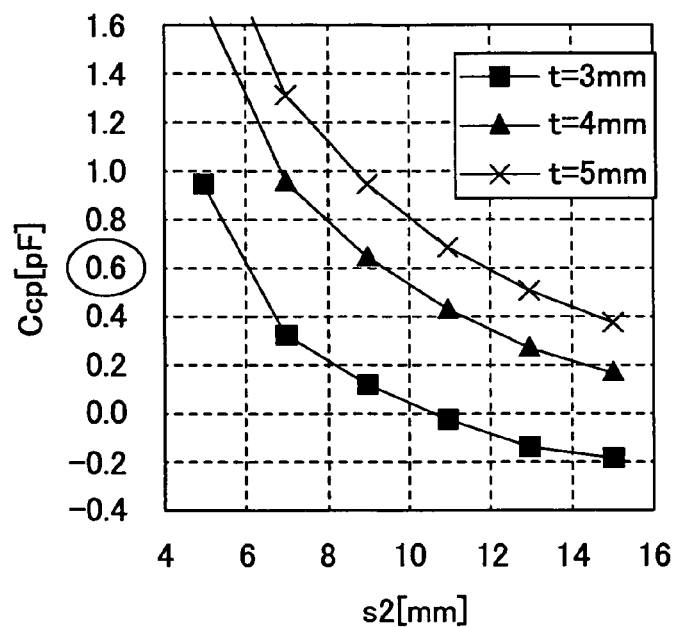
FIG. 13A is a diagram showing the correspondence between inductor length and capacitance ($\epsilon_r=3.0$)
Figure 13B:
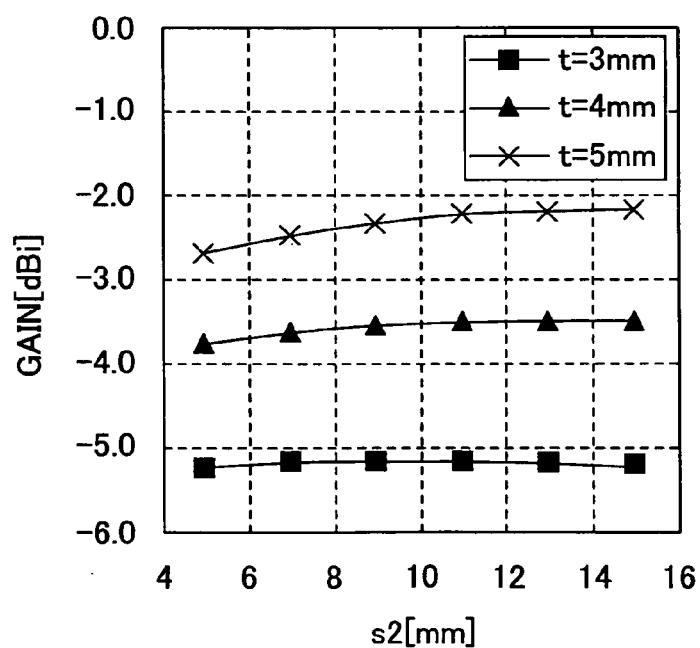
FIG. 13B is a diagram showing the correspondence between inductor length and gain ($\epsilon_r=3.0$)
Figure 13C:
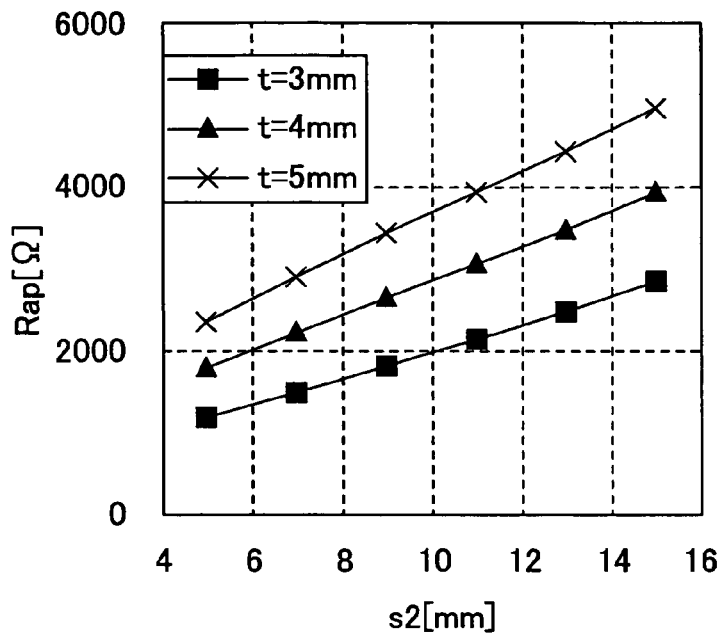
FIG. 13C is a diagram showing the correspondence between inductor length and resistance ($\epsilon_r=3.0$)

The three graphs of FIG. 13A show the relationship between the chip capacitance $C_{CP}$ and the inductor length s2 with respect to spacer thicknesses t of 3, 4, and 5 mm. The three graphs of FIG. 13B show the relationship between the antenna gain (dBi) and the inductor length s2 with respect to spacer thicknesses t of 3, 4, and 5 mm. The three graphs of FIG. 13C show the relationship between the antenna resistance (Ω) and the inductor length s2 with respect to spacer thicknesses t of 3, 4, and 5 mm. The simulation assumes usage of an antenna of 73 mm in overall length having dimensions as shown in FIG. 8A.

In this embodiment also, the antenna-side inductance $L_A$ is controlled by controlling the inductor length s2, thereby satisfying the above-described relationship. In the simulation, $C_{CP}$ is equal to 0.57 pF. If the spacer thickness t is 5 mm, it is necessary from FIG. 13A that the inductor length s2 be approximately 12 mm. In this case, it is known that the antenna gain is approximately −2.2 dBi and that the resistance is approximately 4.2 kΩ. If the spacer thickness t is 4 mm, it is necessary from FIG. 13A that the inductor length s2 be approximately 9.5 mm. In this case, it is known from FIG. 13B that the antenna gain is approximately −3.5 dBi and from FIG. 13C that the resistance is approximately 2.8 kΩ. Further, if the spacer thickness t is 3 mm, it is necessary from FIG. 13A that the inductor length s2 be approximately 6 mm. In this case, it is known from FIG. 13B that the antenna gain is approximately −5.2 dBi and from FIG. 13C that the resistance is approximately 1.3 kΩ.

EXAMPLE SIMULATION 6

Figure 14A:
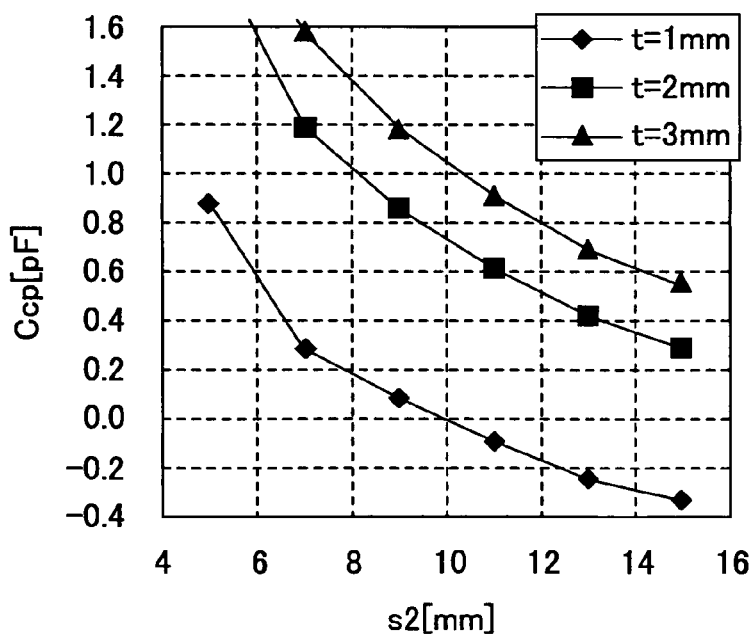
FIG. 14A is a diagram showing the correspondence between inductor length and capacitance ($\epsilon_r=3.0$)
Figure 14B:
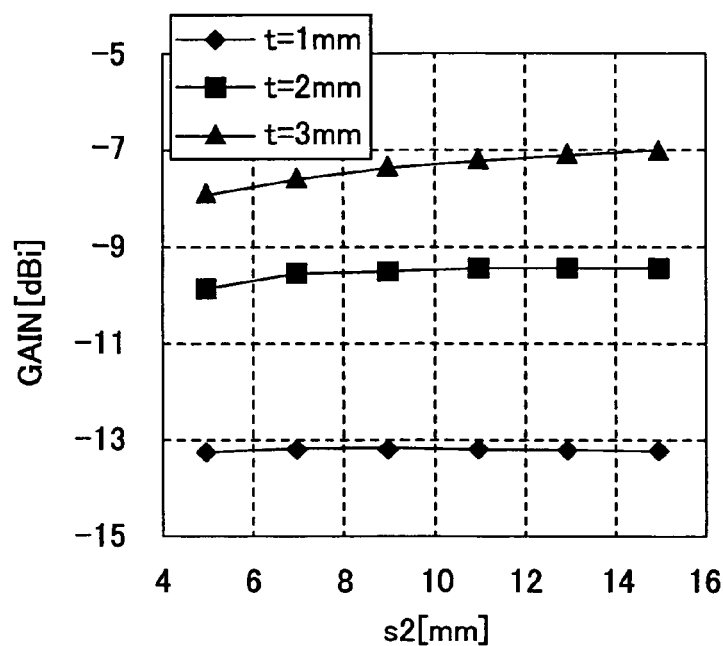
FIG. 14B is a diagram showing the correspondence between inductor length and gain ($\epsilon_r=3.0$)
Figure 14C:
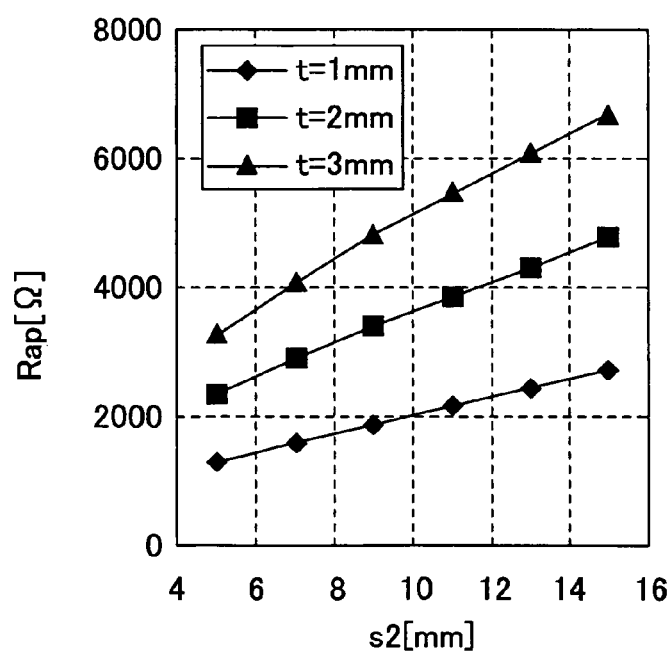
FIG. 14C is a diagram showing the correspondence between inductor length and resistance ($\epsilon_r=3.0$)

The three graphs of FIG. 14A show the relationship between the chip capacitance $C_{CP}$ and the inductor length s2 with respect to spacer thicknesses t of 1, 2, and 3 mm. The three graphs of FIG. 14B show the relationship between the antenna gain (dBi) and the inductor length s2 with respect to spacer thicknesses t of 1, 2, and 3 mm. The three graphs of FIG. 14C show the relationship between the antenna resistance (Ω) and the inductor length s2 with respect to spacer thicknesses t of 1, 2, and 3 mm. The simulation assumes usage of an antenna of 63 mm in overall length having dimensions as shown in FIG. 10A.

In this embodiment also, the antenna-side inductance $L_A$ is controlled by controlling the inductor length s2, thereby satisfying the above-described relationship. In the simulation, $C_{CP}$ is equal to 0.57 pF. If the spacer thickness t is 3 mm, it is necessary from FIG. 14A that the inductor length s2 be approximately 14.5 mm. In this case, it is known that the antenna gain is approximately −7 dBi and that the resistance is approximately 6.5 kΩ. If the spacer thickness t is 2 mm, it is necessary from FIG. 14A that the inductor length s2 be approximately 11 mm. In this case, it is known from FIG. 14B that the antenna gain is approximately −9.4 dBi and from FIG. 14C that the resistance is approximately 3.9 kΩ. Further, if the spacer thickness t is 1 mm, it is necessary from FIG. 14A that the inductor length s2 be approximately 6 mm. In this case, it is known from FIG. 14B that the antenna gain is approximately −13.2 dBi and from FIG. 14C that the resistance is approximately 1.2 kΩ.

Thus, by reducing the overall length of the antenna from 73 mm to 63 mm, it is possible to find an inductor length s2 corresponding to an appropriate capacitance $C_{CP}$ and to achieve impedance matching even if the spacer thickness t is less than 3 mm.

EXAMPLE SIMULATION 7

FIG. 15A shows the relationship among various parameters and the coverage distance of the antenna. The relationship among the spacer thickness t of the antenna, the dimensions of the antenna, the inductor length s2, and the gain is the same as that obtained from the results of the simulations shown in FIGS. 13A through 13C and FIGS. 14A through 14C. The coverage distance ratio to a reference antenna is the ratio (%) of the communication distance over which communications are performable with an antenna shorter than a half-wavelength according to this embodiment to the communication distance over which communications are performable with a half-wavelength dipole antenna having a gain of 2 dBi (reference distance), the same as in the table of FIG. 11A. The reference distance is set at 230 cm in the coverage distance (first example), and the reference distance is set at 300 cm in the coverage distance (second example).

In the case of spacer thicknesses of 1, 2, and 3 mm, an antenna having a short overall length as shown in FIG. 10A is used. In this case, the coverage distance ratio to a reference antenna is approximately 17%, approximately 27%, and approximately 35% as shown in the second through fourth rows of the ratio in the table. In the case of spacer thicknesses of 4 and 5 mm, an antenna having a long overall length as shown in FIG. 8A is used. In this case, the coverage distance ratio to a reference antenna is approximately 53% and approximately 62%, respectively, as shown in the fifth and sixth rows of the ratio in the table. FIG. 15B shows a graph of the relationship between the spacer thickness and the coverage distance in the case of a reference distance of 230 cm and in the case of a reference distance of 300 cm. It is shown, as graphically illustrated, that as the spacer thickness increases, the coverage distance increases. According to this embodiment also, it is possible to achieve a long coverage distance for an antenna much shorter (6 through 7 cm) in length than the half-wavelength (approximately 16 cm). As a result, it is possible to obtain an RF tag extremely small in size.

EXAMPLE SIMULATION 8

Figure 16:
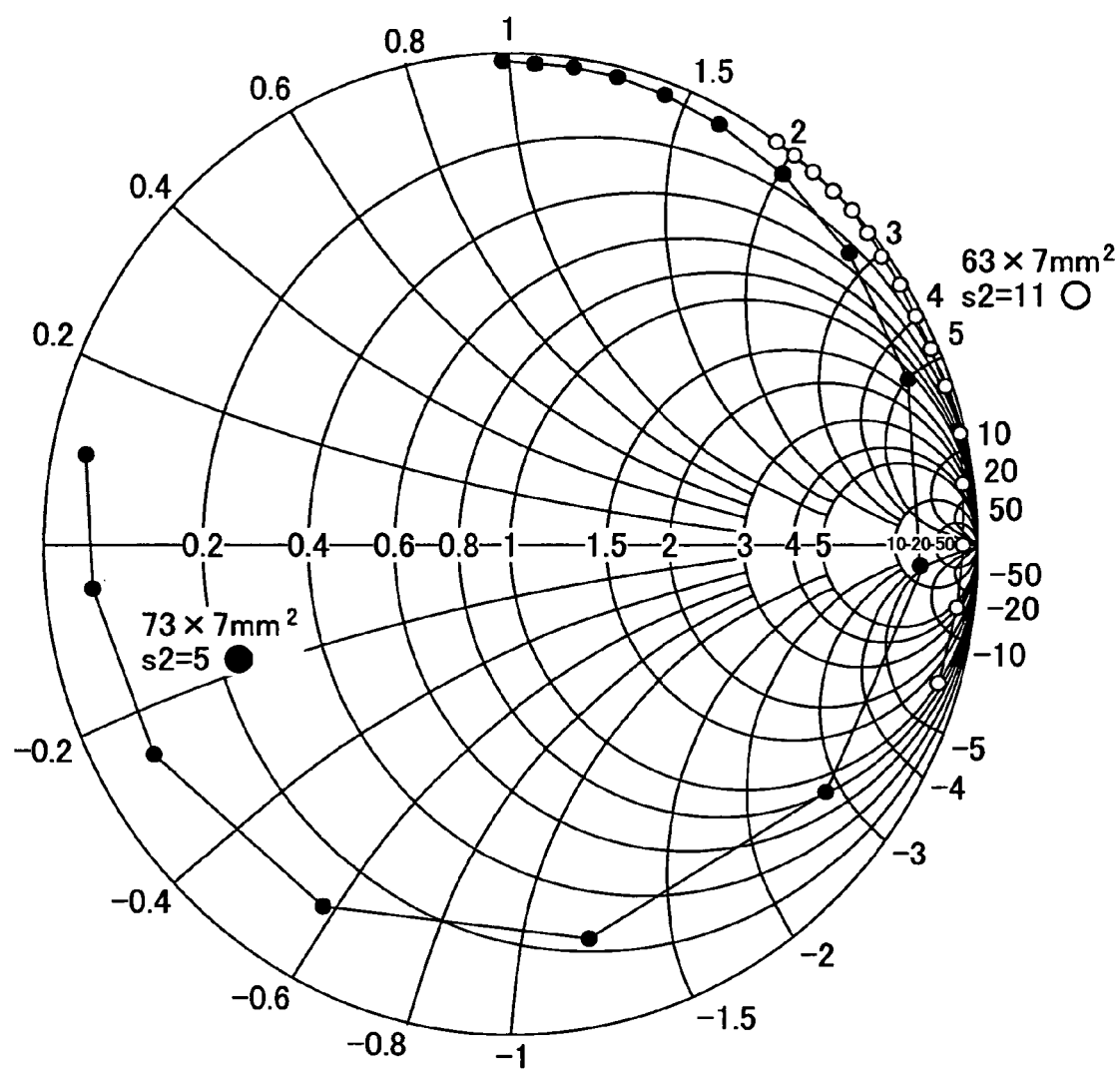
FIG. 16 is a Smith chart showing frequency characteristics of antenna patterns ($\epsilon_r=2.3$)

FIG. 16 is a Smith chart showing frequency characteristics with respect to two antenna patterns. In this simulation also, an antenna having an overall length L of 73 mm as shown in FIG. 8A, an inductor length s2 of 5 mm, and a spacer thickness t of 3 mm (referred to as "long antenna" for convenience), and an antenna having an overall length L of 63 mm as shown in FIG. 10A, an inductor length s2 of 11 mm, and a spacer thickness t of 3 mm (referred to as "short antenna" for convenience) are prepared the same as in FIG. 12. Unlike the spacer used in the first embodiment, the spacer used in the second embodiment has a relative dielectric constant of 3.0 and a dielectric loss (tanδ) of 0.01. The impedances of the short antenna and the long antenna are measured every 20 MHz in the frequencies between 800 MHz and 1.1 GHz, and are plotted onto a Smith chart, which is shown in FIG. 16. In the drawing, the locus plotted with white circles is for the short antenna, and the locus plotted with black circles is for the long antenna. In general, as the frequency gradually increases, the antenna impedance plots a locus moving clockwise around a certain circle on the Smith chart. Since the impedance varies greatly in accordance with frequency variations in the long antenna, the long antenna is not suitable for broadband product uses (but can be used for narrowband product uses). Since impedance variations are limited relative to frequency variations in the short antenna, the short antenna can be used for broadband product uses. In the case shown in FIG. 16, the impedance variations relative to frequency variations are greater than in the case shown in FIG. 12, which is due to the difference between the dielectric constants of dielectrics used. Those with lower dielectric constants are suitable for broadband product uses.

[Third Embodiment]

Figure 17A:
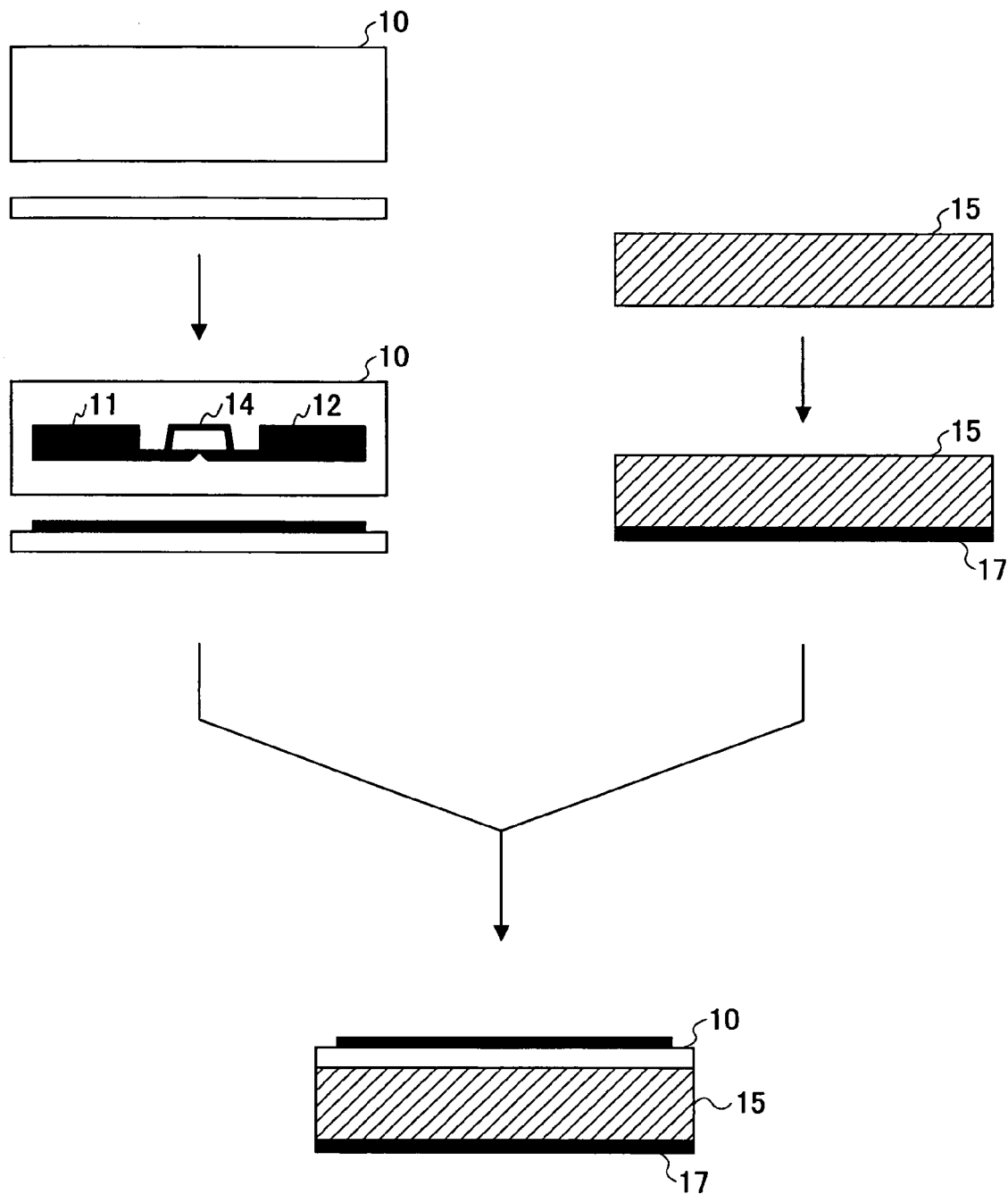
FIG. 17A is a diagram showing a method of manufacturing the RF tag.

The RF tag as shown in FIG. 1 can be manufactured by various methods. For example, the second insulating layer 10 may be provided on the first insulating layer 15, a desired conductive pattern may be formed on the second insulating layer 10, and an integrated circuit may be mounted in the feeding part 13. The ground conductor 17 may be provided on the bottom surface of the first insulating layer 15 as required. The insulating layer under the conductive pattern (antenna) may have a single layer structure or a multilayer structure containing two or more insulating layers. Alternatively, the RF tag may be completed by sticking the conductive layer of the antenna and its underlying insulating layer to each other after they are separately formed as shown in FIG. 17A. The conductive layer part of the antenna can be prepared, for example, by forming a conductive pattern for an antenna on a thin insulating layer such as the PET film 10. An appropriate manufacturing method can be suitably selected depending on manufacturing facilities or the actual situation of business transactions. A third embodiment of the present invention described below is advantageous in the case where the conductive layer of the antenna and its underlying insulating layer are separately formed.

By the way, the antenna size and the material characteristics (such as dielectric constant and dielectric loss) of the insulating layer of an RF tag according to the present invention are determined so that it is possible to perform desired radio communications when the RF tag is attached to a conductive object. Accordingly, it is expected that even if the conductive layer part of the antenna is prepared, it alone does not function sufficiently as an RF tag.

Figure 17B:
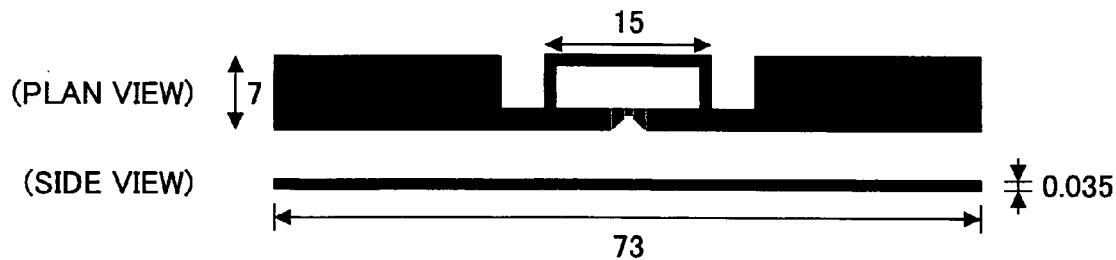
FIG. 17B is a diagram showing a conductor forming the pattern of an antenna.
Figure 17C:
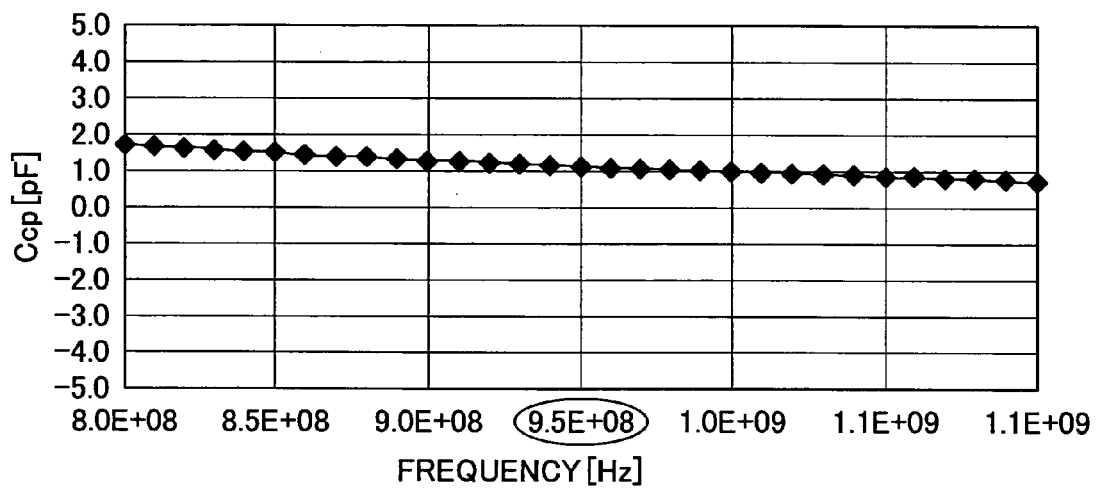
FIG. 17C is a diagram showing the relationship between an operating frequency and matching capacitance with respect to the antenna of FIG. 17B.

FIG. 17B shows a plan view and a side view of only the conductive layer of the antenna. The antenna has dimensions as shown in FIG. 8A, and the inductor length s2 is set at 15 mm for use after completion of the RF tag. FIG. 17C shows the result of a simulation with respect to the antenna in the middle of its manufacturing process as shown in FIG. 17B. This simulation result shows the relationship between the capacitance $C_{CP}$ taken into consideration in the case of matching the antenna and the integrated circuit and the frequency used in communications. Actual products are designed to operate at a frequency of, for example, 950 MHz (9.5E+08 Hz). As described above, the capacitance on the integrated circuit side is typically approximately 0.6 pF. The graphically illustrated simulation result shows that the capacitance is greater than 1.0 at 950 MHz with only the conductive layer part of the antenna and the antenna and the integrated circuit do not match sufficiently. Accordingly, it is not possible to perform good radio communications through the antenna in this condition.

Figure 18A:
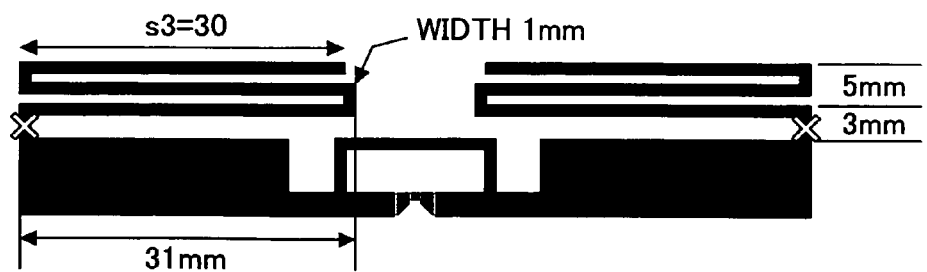
FIG. 18A is a diagram showing an antenna having an extra conductive pattern.

FIG. 18A shows a pattern of the antenna in the middle of its manufacturing process according to one embodiment of the present invention. As graphically illustrated, an additional conductive line is appended to each of the first and second radiating elements. The additional conductive lines extend in bilateral symmetry along the lengthwise directions (lateral directions in the drawing) of the antenna, and are bent multiple times. In other words, the additional conductive lines meander to be prepared in a meandering shape. In the graphically illustrated case, the additional lines have a width of 1 mm, and are folded back twice so as to each fit in the range of approximately 30 mm from the left end or right end of the antenna. Therefore, each of the right and left radiating elements is extended for the length of the line of 90 (30×3) mm.

Figure 18B:
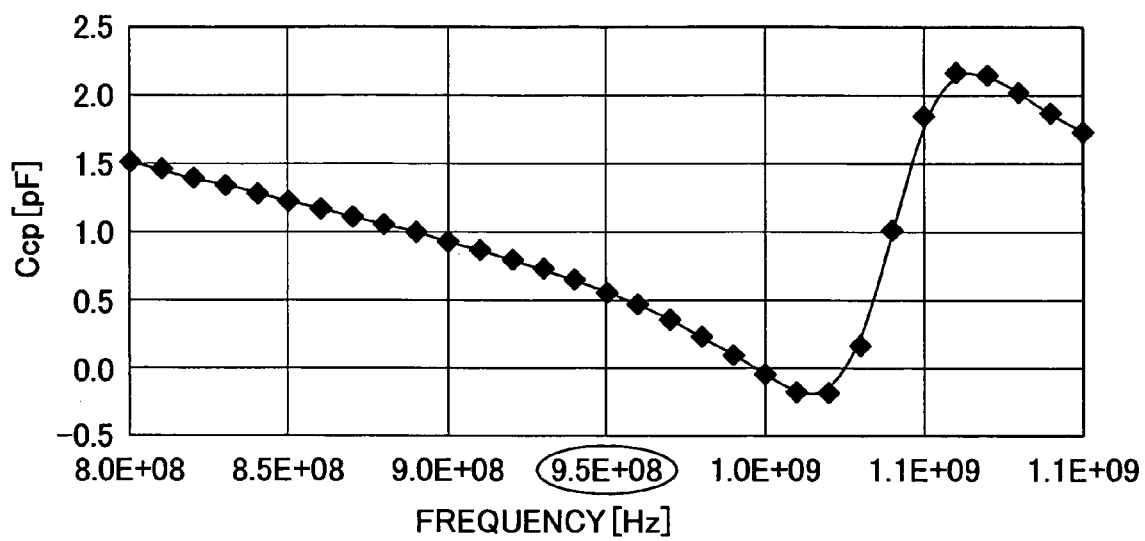
FIG. 18B is a diagram showing the relationship between an operating frequency and matching capacitance with respect to the antenna of FIG. 18A.

FIG. 18B shows the result of a simulation with respect to the antenna as shown in FIG. 18A. This simulation result also shows the relationship between the capacitance $C_{CP}$ taken into consideration in the case of matching the antenna and the integrated circuit and the frequency used in communications. The capacitance on the integrated circuit side is typically approximately 0.6 pF. The graphically illustrated simulation result shows that the capacitance is appropriately about 0.6 pF at 950 MHz so that the antenna and the integrated circuit match. Accordingly, it is possible to perform radio communications through the antenna in this condition in the middle of its manufacturing process. This means that even if the RF tag is uncompleted it is possible to perform product management and physical distribution management using the uncompleted RF tag. For example, in the case of printing the conductive pattern of the antenna on a PET film with a printer, the printer may perform printing while reading a serial number or the like from the RF tag. The printer may also print information derived from the information read at the time of printing on the antenna side. For example, the printer may read a serial number or the like from the RF tag and print information indicating the manufacturer on the PET film side, thereby authenticating the RF tag or an object to which the RF tag is to be attached.

The additional conductive lines formed in a meandering manner are elements unnecessary for the completed RF tag. Accordingly, the additional lines are removed after some radio communications are performed in the middle of the manufacturing process. In the case shown in FIG. 18A, the lines are physically cut at points indicated by crosses in the drawing. The additional lines may be entirely removed, or after the parts marked with the crosses are cut by punching, the remaining lines may be left as they are. This is because it is satisfactory if the unnecessary lines do not affect radio communications after completion of the RF tag. However, it is desirable to remove all the unnecessary lines in terms of ensuring operating characteristics as much as possible.

Figure 19A:
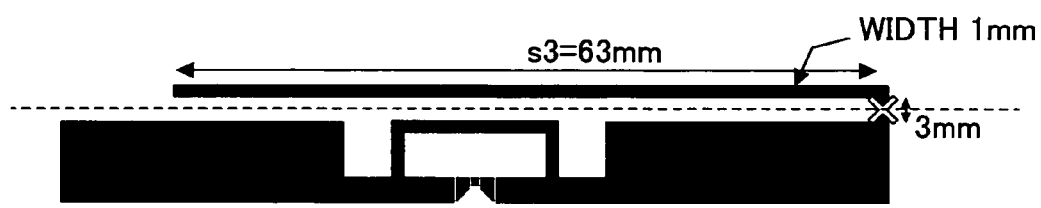
FIG. 19A is a diagram showing an antenna having an extra conductive pattern.

FIG. 19A shows a pattern of the antenna in the middle of its manufacturing process according to one embodiment of the present invention. In this case, an additional conductive line is appended to only one radiating element (on the right side) as graphically illustrated. The additional conductive line extends in the lengthwise directions (lateral directions in the drawing) of the antenna. In this embodiment, the additional line does not meander, and is linear. In the graphically illustrated case, the additional line has a width of 1 mm and a length of 63 mm from the right end of the antenna. Accordingly, the right-side radiating element is extended for it.

Figure 19B:
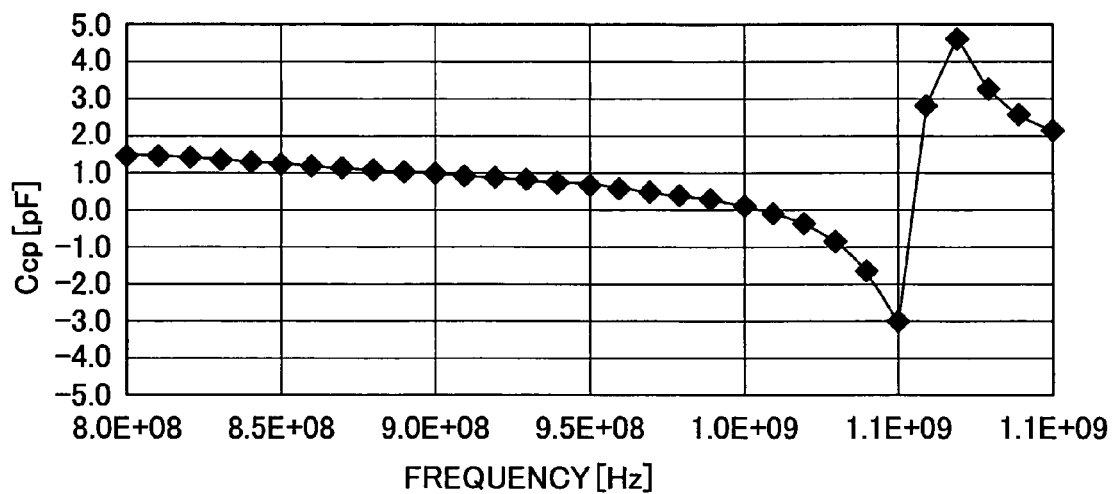
FIG. 19B is a diagram showing the relationship between an operating frequency and matching capacitance with respect to the antenna of FIG. 19A.

FIG. 19B shows the result of a simulation with respect to the antenna as shown in FIG. 19A. This simulation result also shows the relationship between the capacitance $C_{CP}$ taken into consideration in the case of matching the antenna and the integrated circuit and the frequency used in communications. The capacitance on the integrated circuit side is typically approximately 0.6 pF. The graphically illustrated simulation result shows that the capacitance is appropriately about 0.6 pF at 950 MHz so that the antenna and the integrated circuit match. Accordingly, it is possible to perform radio communications through the antenna in this condition in the middle of its manufacturing process.

This additional conductive line is an element unnecessary for the completed RF tag. Accordingly, the additional line is removed after some radio communications are performed in the middle of the manufacturing process. In the case shown in FIG. 19A, the line is physically cut at a point indicated by a cross in the drawing. The additional line may be entirely removed, or after the part marked with the cross is cut by punching, the remaining line may be left as it is.

The additional line may be provided to only one radiating element as shown in FIG. 19A or may be provided to both radiating elements. By way of example, in the latter case, the additional line may be provided on each of the side on which the inductor is provided and the side on which the inductor is not provided with respect to the feeding part. In FIG. 18A and FIG. 19A, the length of the antenna is extended by connecting the conductive line(s) to the radiating element(s). Alternatively, an additional antenna may be formed with a two-dimensional planar element instead of a line.

Figure 20:
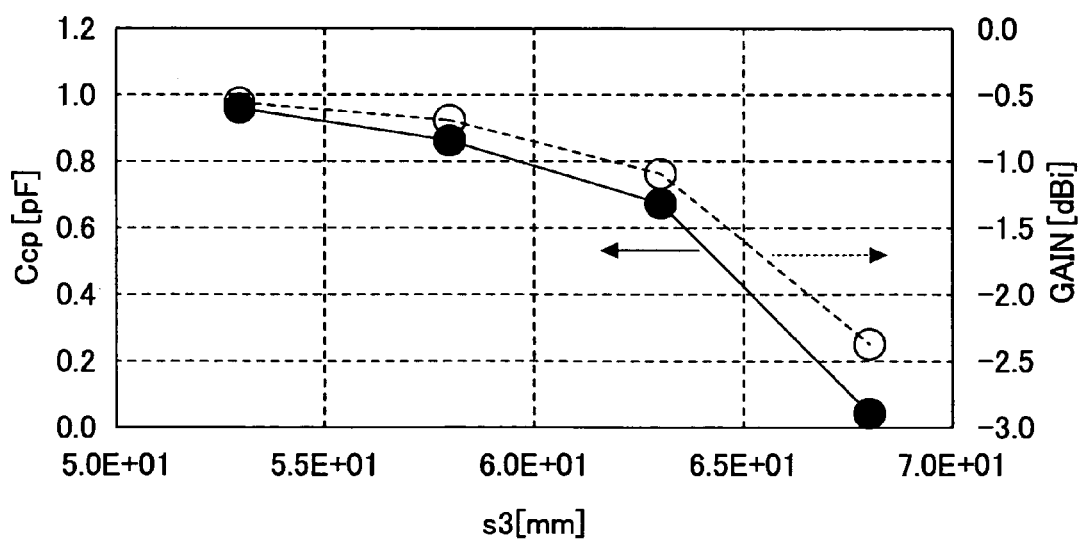
FIG. 20 is a diagram showing the relationship between the length of the extra line of the antenna of FIG. 19A and matching capacitance and the relationship between the length of the extra line of the antenna of FIG. 19A and gain.

FIG. 20 shows the result of a simulation with respect to the antenna as shown in FIG. 19A. This simulation result shows the relationship between the length s3 of the additional line and the capacitance $C_{CP}$ taken into consideration in the case of matching the antenna and the integrated circuit (solid-line graph) and the relationship between the length s3 of the additional line and the gain (broken-line graph). As shown in the solid-line graph, it is possible to obtain an appropriate capacitance and gain by setting the length s3 of the additional line at around 60 mm.

Figure 21:
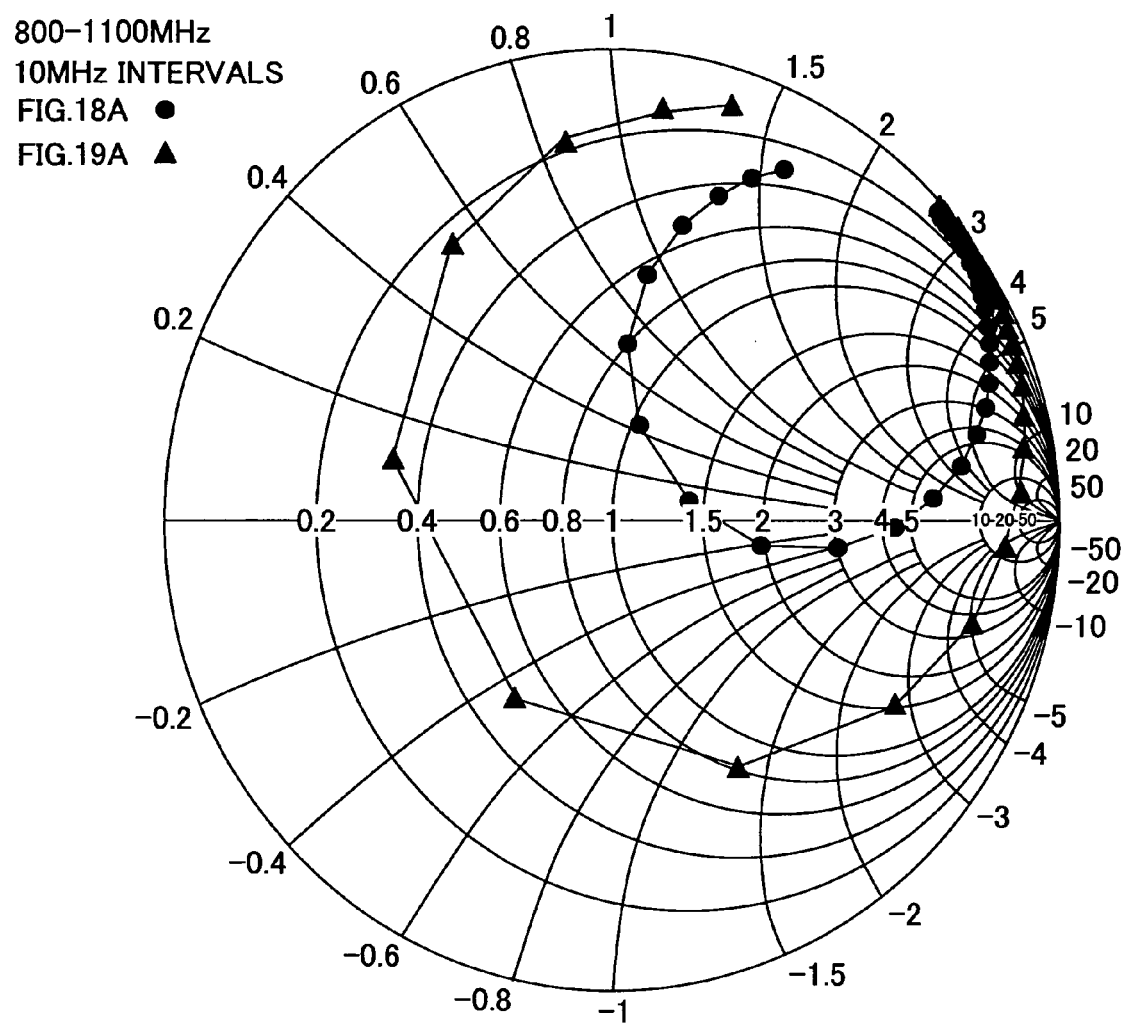
FIG. 21 is a Smith chart showing the frequency characteristics of the antennas shown in FIG. 18A and FIG. 19A.

FIG. 21 is a Smith chart showing frequency characteristics with respect to an antenna pattern having a shape as shown in FIG. 18A (Type I) and an antenna pattern having a shape as shown in FIG. 19A (Type II). The impedances of the Type I and Type II antennas are measured every 10 MHz in the frequencies between 800 MHz and 1.1 GHz, and are plotted onto a Smith chart, which is shown in FIG. 21. As described above, as the frequency gradually increases, the antenna impedance plots a locus moving clockwise around a certain circle on the Smith chart. According to the graphically illustrated simulation results, the Type I antenna (FIG. 18A) plots a relatively small circle in the first quadrant. The Type II antenna (FIG. 19A) plots a relatively large circle. This shows that Type I is more suitable for broadband product uses than Type II. However, Type II has an advantage over Type I in terms of manufacturing ease and costs.

[Fourth Embodiment]

The relationship between the inductor length s2 and the capacitance $C_{CP}$ is discussed in FIGS. 8B and 10B described in the first embodiment. For example, in the case where the spacer thickness t of a spacer having a relative dielectric constant $\epsilon_r$ of 2.3 is 3 mm and the inductor length s2 is 15 mm, the capacitance $C_{CP}$ is approximately 0.55 pF if the overall length L of the antenna is 73 mm and the capacitance $C_{CP}$ is approximately 0.9 pF if the overall length L of the antenna is 63 mm.

The relationship between the inductor length s2 and the capacitance $C_{CP}$ is also discussed in FIGS. 13A and 14A described in the second embodiment. For example, in the case where the spacer thickness t of a spacer having a relative dielectric constant $\epsilon_r$ of 3.0 is 3 mm and the inductor length s2 is 6 mm, the capacitance $C_{CP}$ is approximately 0.6 pF if the overall length L of the antenna is 73 mm and the capacitance $C_{CP}$ is greater than 1.6 pF if the overall length L of the antenna is 63 mm.

From these relationships, the capacitance $C_{CP}$ is expected to increase as the overall length L of the antenna decreases and to decrease as the overall length L of the antenna increases. This suggests that an adjustment can be made to an appropriate capacitance $C_{CP}$ by controlling the antenna length L aside from controlling the inductor length s2. In a fourth embodiment of the present invention, the overall length L of the antenna is controlled from such a viewpoint.

Figure 22A:
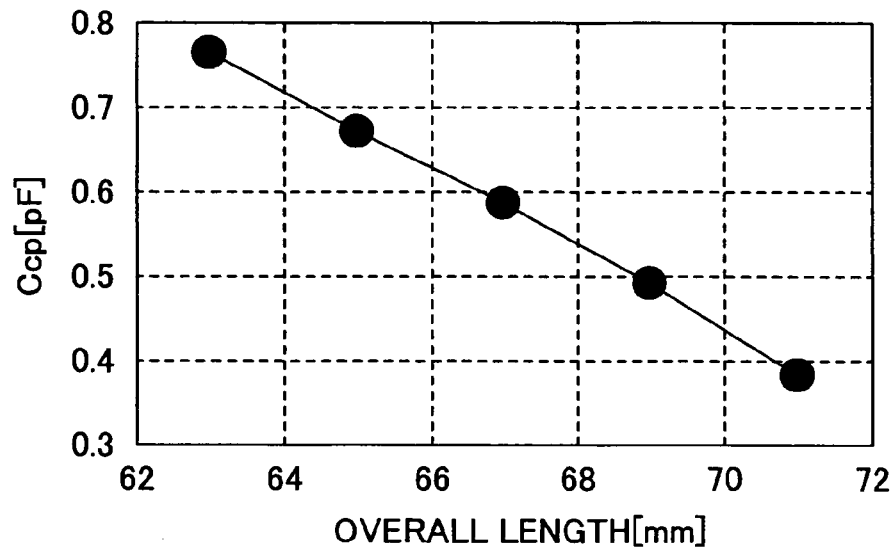
FIG. 22A is a diagram showing the relationship between antenna length and matching capacitance.
Figure 22B:
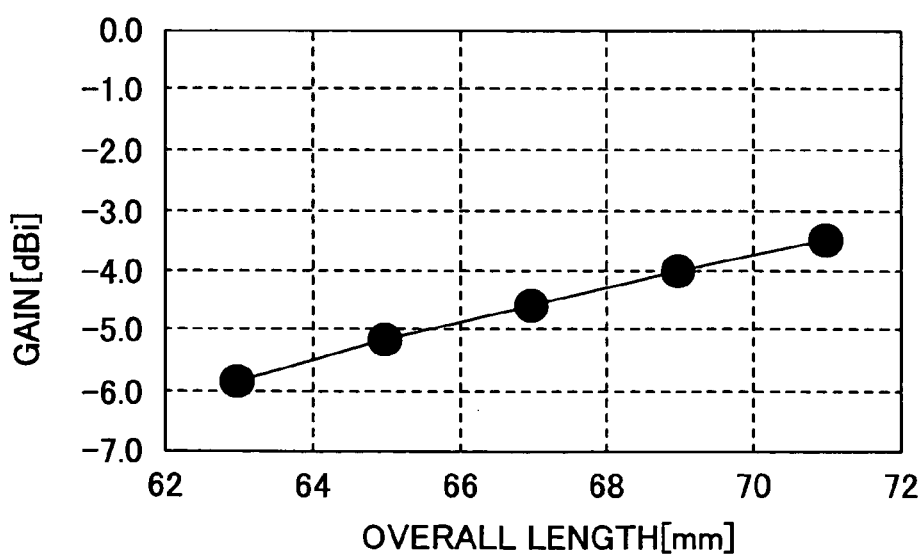
FIG. 22B is a diagram showing the relationship between antenna length and gain.
Figure 22C:
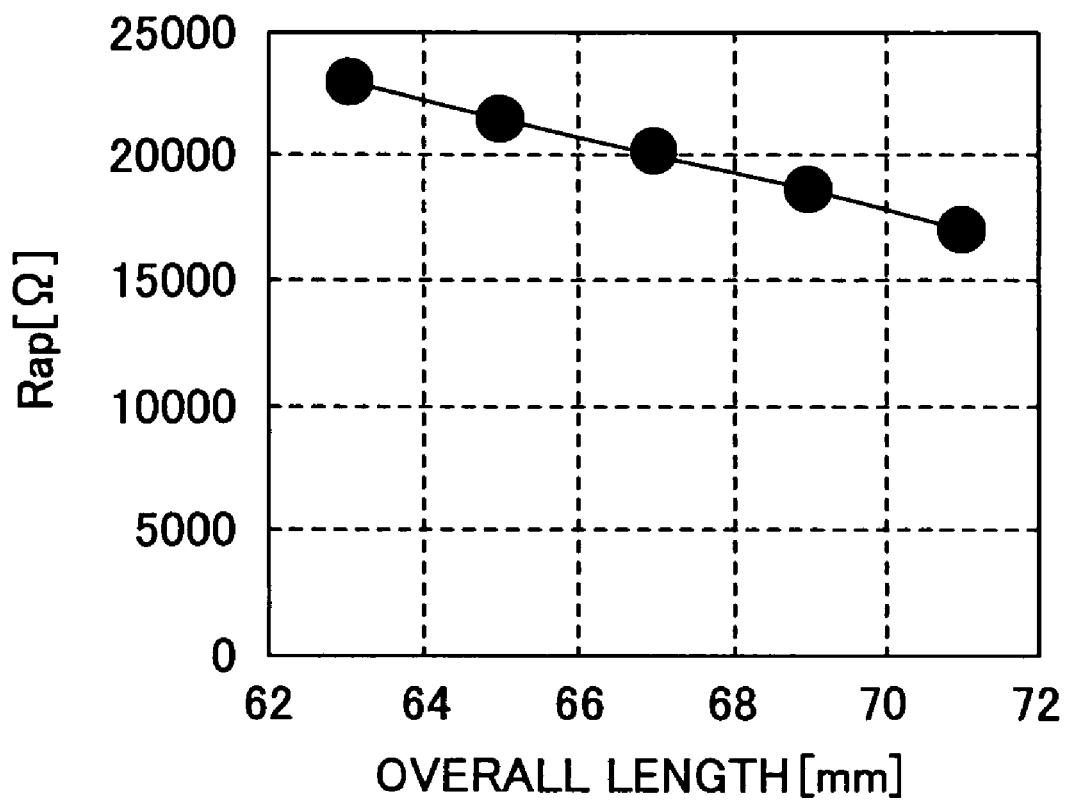
FIG. 22C is a diagram showing the relationship between antenna length and resistance.

FIG. 22A shows the capacitance $C_{CP}$ in the case of varying the overall length L of the antenna between 63 through 73 mm. The spacer thickness t is 3 mm and the inductor length s2 is 15 mm. As graphically illustrated, it is shown that the capacitance $C_{CP}$ decreases as the overall length L increases. FIG. 22A shows that the overall length L may be approximately 67 mm in order to have a capacitance of approximately 0.6 pF. FIG. 22B shows the relationship between the overall length L and the gain of the antenna. It shows that the gain is approximately −4.5 dBi when the overall length L is approximately 67 mm. FIG. 22C shows the relationship between the overall length L and the resistance of the antenna. It shows that the resistance is 20 kΩ when the overall length L is 67 mm.

According to this embodiment, the impedance of the antenna and the impedance of the integrated circuit can be matched by controlling the overall length L of the antenna instead of the inductor length s2 of the antenna. Since controlling the inductor length requires a change in the pattern of a conductive line, work such as soldering due to the line change is required. Accordingly, the quality of the soldering affects the loss resistance of the antenna, etc. On the other hand, according to this embodiment, it is not necessary to change soldering, and the accuracy of cutting the conductive pattern affects the antenna characteristics.

Figure 23:
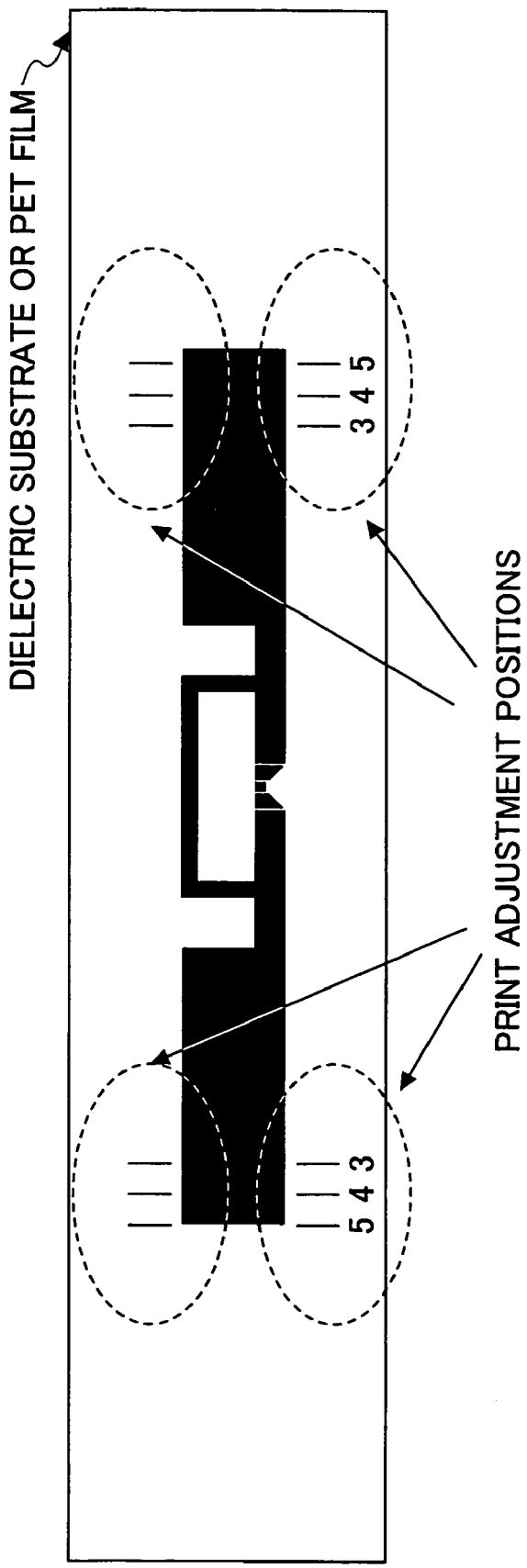
FIG. 23 is a diagram showing an antenna pattern printed with possible cutting positions.

On the other hand, the antenna dimensions of FIG. 8A are employed in the case of a relatively large spacer thickness, and the antenna dimensions of FIG. 10A are employed in the case of a relatively small spacer thickness. Accordingly, it is desirable to suitably control the overall length L of the antenna depending on the thickness of a spacer used under the antenna. For example, as shown in FIG. 23, it facilitates controlling the antenna length to mark cutting points corresponding to spacer thicknesses with a conductive pattern on the PET film 10. In FIG. 23, both end positions of the antenna are marked in accordance with spacer thicknesses of 3, 4, and 5 mm. Further, this embodiment and the above-described third embodiment may be coupled. For example, information such as cutting positions may be prestored in the integrated circuit of the RF tag, the information may be read with a printer in the middle of the manufacturing process, the cutting positions may be calculated in accordance with the read information, and marks indicating the positions may be printed on the PET film together with the antenna.

Figure 24:
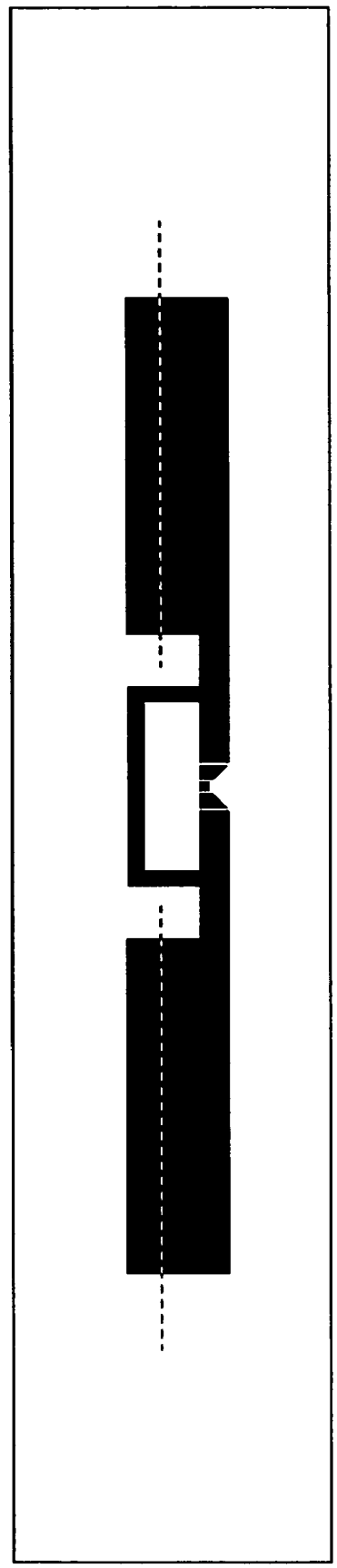
FIG. 24 is a diagram showing another cutting direction.

The antenna may be cut in a direction that is not perpendicular to the lengthwise directions. As indicated by a broken line in FIG. 24, part of the antenna may be cut off along the lengthwise directions. This is because it is satisfactory if the effective length of the antenna is properly reduced after the cutting. More generally, it is satisfactory as long as the shape of the antenna can be changed so as to enable radio communications both before and after completion of the RF tag.

The present invention is not limited to the specifically disclosed embodiments, and variations and modifications may be made without departing from the scope of the present invention.

What is claimed is:

1. An RF tag, comprising:
an antenna; and
an integrated circuit connected to the antenna,
wherein the antenna includes
a first radiating element formed of a first strip-shaped conductor;
a second radiating element formed of a second strip-shaped conductor;
a feeding part connected in series between the first and second radiating elements; and
an impedance control part connected parallel to the feeding part, and
wherein two sides of one of the first and second strip-shaped conductors along a direction in which the one of the first and second strip-shaped conductors extends are aligned with two sides of another one of the first and second strip-shaped conductors.

2. The RF tag as claimed in claim 1, wherein the RF tag after the completion accompanies a conductive object.

3. The RF tag as claimed in claim 1, wherein the antenna after the completion of the RF tag has a length shorter than a half of a wavelength used in a communication.

4. The RF tag as claimed in claim 1, wherein the feeding part is connected to a line extending along a side of each of the first and second strip-shaped conductors.

5. The RF tag as claimed in claim 1, wherein the impedance control part is formed of a bent conductive line.

6. The RF tag as claimed in claim 1, wherein an insulating layer supporting the antenna has a multilayer structure including at least a polyethylene terephthalate layer and a spacer layer.

7. A method of manufacturing an RF tag to accompany a conductive object, the RF tag having an integrated circuit connected to an antenna, the method comprising:
forming the antenna of a predetermined shape on one surface of a first insulating layer so that the antenna of the predetermined shape has a first radiating element, a second radiating element, an auxiliary radiating element connected to one or both of the first and second radiating elements, and a feeding part connected in series between the first and second radiating elements;
changing the antenna of the predetermined shape into another shape;
joining a second insulating layer to another surface of the first insulating layer; and
performing a radio communication with the integrated circuit before completion of the RF tag, using the auxiliary radiating element connected to the one or both of the first and second radiating elements,
wherein the auxiliary radiating element is not used for the radio communication after the completion of the RF tag.

8. The method as claimed in claim 7, wherein:
the radio communication using the first, second, and auxiliary radiating elements is performed after said forming the antenna of the predetermined shape, and
at least a part of the auxiliary radiating element is removed in said changing the antenna of the predetermined shape into the other shape.

9. The method as claimed in claim 8, wherein information determined by the radio communication is attached on one of the first and second insulating layers.

10. The method as claimed in claim 8, wherein a mark indicating one or more positions is attached on one of the first and second insulating layers.

11. The method as claimed in claim 10, wherein the at least part of the auxiliary radiating element is removed in accordance with the mark corresponding to a thickness of the second insulating layer.

12. The method as claimed in claim 7, wherein the auxiliary radiating element is formed so as to include a line along a lengthwise direction of the antenna.

13. The method as claimed in claim 12, wherein the auxiliary radiating element is formed into a meandering shape.

* * * * *